US007957020B2

(12) United States Patent
Mine et al.

(10) Patent No.: US 7,957,020 B2

(45) Date of Patent: Jun. 7, 2011

(54) IMAGE FORMING APPARATUS, IMAGE FORMING SYSTEM, AND CONTROL PROGRAM THEREOF TO MANAGE PRINTING SHEET COMMUNICATIONS

(75) Inventors: Ryuta Mine, Toride (JP); Manabu Yamauchi, Kashiwa (JP); Naoto Yamada, Kawasaki (JP); Hideyuki Ikegami, Abiko (JP)

(73) Assignee: Canon Kabushiki Kaisha, Toyko (JP)

( * ) Notice: Subject to any disclaimer, the term of this patent is extended or adjusted under 35 U.S.C. 154(b) by 1182 days.

(21) Appl. No.: 11/373,436

(22) Filed: Mar. 10, 2006

(65) Prior Publication Data

US 2006/0210284 A1 Sep. 21, 2006

(30) Foreign Application Priority Data

Mar. 15, 2005 (JP) ................................ 2005-073116
Mar. 16, 2005 (JP) ................................ 2005-075164

(51) Int. Cl.
*G06F 15/00* (2006.01)
*G06F 3/12* (2006.01)
*G06K 1/00* (2006.01)

(52) U.S. Cl. ........................ 358/1.15; 358/1.9; 358/1.13

(58) Field of Classification Search .................. 358/1.9, 358/1.13, 1.15
See application file for complete search history.

(56) References Cited

U.S. PATENT DOCUMENTS 5,689,760 A 11/1997 Suzuki et al.
2003/0072030 A1* 4/2003 Haines et al. ................ 358/1.15
2004/0201867 A1* 10/2004 Katano ........................ 358/1.15
2004/0257601 A1* 12/2004 Tomiyasu et al. .............. 358/1.9
2004/0268132 A1* 12/2004 Waris ............................ 713/185
2005/0116034 A1* 6/2005 Satake et al. .................. 235/432
2005/0220060 A1* 10/2005 Takusagawa et al. ......... 370/338
2006/0227365 A1* 10/2006 Hohensee et al. ........... 358/1.15

FOREIGN PATENT DOCUMENTS

JP 07-191510 A 7/1995
JP 2001-192144 A 7/2001
JP 2002-073291 A 3/2002
JP 2004-123366 A 4/2004
JP 2005-035144 A 2/2005

* cited by examiner

*Primary Examiner* — Chan S Park
*Assistant Examiner* — Ming Hon
(74) *Attorney, Agent, or Firm* — Canon USA, Inc. IP Division

(57) ABSTRACT

An image forming apparatus is provided, in carrying out an image forming operation using a paper sheet, that uses a sheet containing a wireless tag that stores an address storing control information for performing an optimum image forming. The image forming apparatus obtains the address from the wireless tag using a receiving device, and obtains control information from a server via a network based on the obtained address. The image forming apparatus controls an image forming condition based on the control information, and carries out the image forming under image forming conditions optimum for the sheet.

25 Claims, 20 Drawing Sheets

FIG.16A

| | | | | |
|---|---|---|---|---|
| 1 | 3 | 5 | 7 | 9 |
| 18 | 20 | 22 | 24 | 11 |
| 16 | 27 | 29 | 26 | 13 |
| 14 | 25 | 30 | 28 | 15 |
| 12 | 23 | 21 | 19 | 17 |
| 10 | 8 | 6 | 4 | 2 |

FIG.16B

| | | | | |
|---|---|---|---|---|
| 15 | 17 | 1 | 5 | 9 |
| 11 | 27 | 19 | 23 | 13 |
| 7 | 25 | 29 | 22 | 4 |
| 3 | 21 | 30 | 26 | 8 |
| 14 | 24 | 20 | 28 | 12 |
| 10 | 6 | 2 | 18 | 16 |

FIG.16C

| | | | | |
|---|---|---|---|---|
| 1 | 2 | 3 | 4 | 5 |
| 18 | 19 | 20 | 21 | 6 |
| 17 | 28 | 29 | 22 | 7 |
| 16 | 27 | 30 | 23 | 8 |
| 15 | 26 | 25 | 24 | 9 |
| 14 | 13 | 12 | 11 | 10 |

FIG.16D

| | | | | |
|---|---|---|---|---|
| 1 | 5 | 9 | 13 | 2 |
| 18 | 19 | 23 | 20 | 6 |
| 16 | 28 | 29 | 24 | 10 |
| 12 | 26 | 30 | 27 | 14 |
| 8 | 22 | 25 | 21 | 17 |
| 4 | 15 | 11 | 7 | 3 |

IMAGE FORMING APPARATUS, IMAGE FORMING SYSTEM, AND CONTROL PROGRAM THEREOF TO MANAGE PRINTING SHEET COMMUNICATIONS

BACKGROUND OF THE INVENTION

1. Field of the Invention

The present invention relates to an image forming apparatus that can be connected to a network, an image forming system including the image forming apparatus, and a control program thereof.

2. Description of the Related Art

In a conventional electro-photographic image forming apparatus such as a copying machine or a laser beam printer, the thickness of a sheet is so significant, in forming an image on the sheet, that the thickness of the sheet determines a quality of the image. This is especially the case in a conventional color copying machine because the color copying machine forms one single image by superposing toners of four colors onto one single sheet. As a result, the amount of toner formed on a sheet is significantly larger than in the case of a monochromatic copying machine. Accordingly, in a color copying machine, a difference in the thickness of a sheet considerably affects the quality of an image.

More specifically, in a general and common heating type fixing device in which toner is melted to be fixed, the greater the thickness of a sheet is, the amount of heat that is drawn and absorbed by the sheet during fixing becomes larger. Accordingly, the amount of heat that is used for melting the toner becomes smaller. Thus, with color image which uses a larger amount of toner than in the case of a monochromatic image, the toner many times is poorly fixed because the toner is not sufficiently melted. In order to prevent such poor fixing from occurring in a color copying machine, strict and accurate temperature control is especially necessary, compared to the case of a monochromatic copying machine.

In addition, it is also important, in performing a good and sufficient transfer of a toner image, to change transfer conditions (a transfer bias, for example) for transferring the toner image onto a sheet in accordance with the thickness of the sheet (namely, density of a material of the sheet).

In this regard, Japanese Patent Application Laid-Open No. 2001-192144 discloses a technology in which a sheet thickness determination sensor is provided to determine the thickness of a sheet upon turning on of power or mounting of a sheet feeding cassette, and thus the thickness of a sheet within the feeding cassette that is currently being mounted to the image forming apparatus is recognized. In addition, with this technology, a control apparatus controls a fixing temperature, a speed of image forming, a transfer bias, and the like, in accordance with the recognized sheet thickness.

In addition, the size of a sheet, as well as the thickness of a sheet, is a very significant factor in keeping a sufficient and good quality of an image. This is because just as in the case of the thickness of a sheet, the larger the size of a sheet is, the amount of heat drawn and absorbed by the sheet upon fixing becomes larger. Accordingly, the amount of heat used for melting the toner becomes smaller.

Further, in addition to the thickness and size of a sheet, the type and kind of a sheet is also a significant factor in keeping a good and sufficient quality of an image. In this regard, in the case of an OHP sheet, in which a transparency of a formed image is a very important factor, a fixing operation is performed at a slow fixing speed that is different from the fixing speed in the case of plain paper, in order to secure a sufficient transparency. In addition, in accordance with the recent widespread use of color image forming apparatuses, image forming is carried out at a slow fixing speed even in the case of a sheet other than an OHP sheet, such as a thick paper, in order to improve the quality of an image.

In this regard, for example, Japanese Patent Application Laid-Open No. 07-191510 (corresponding to U.S. Pat. No. 5,689,760) discloses a constitution in which a sensor for detecting the type of a sheet is provided, so that the fixing speed can be changed in accordance with a detection output from the sensor.

Further, there is a method in which information related to various kinds of sheets and control information are previously stored in an image forming apparatus so that when a user sets a sheet into a sheet cassette, information on the set sheet is selected.

Optimum image forming can be performed in relation to any type of sheet if the conditions for image forming are controlled on the basis of a plurality of factors including the thickness, the size, the type, and the like of the sheets used in an image forming apparatus in such a way. However, in this case, it is necessary to provide a sensor for detecting and determining each factor, in relation to each factor. Thus, the number of sensors becomes too large, resulting in complicating a control operation.

In addition, in the case where information related to various kinds of sheets and control information are previously stored in an image forming apparatus, the number of types of sheets to be stored becomes significantly large. Accordingly, a large-capacity memory needs to be provided in order to always store sheet information that a user may not use. Further, in the case of a sheet whose information is not previously stored, an optimum control operation cannot be performed.

SUMMARY OF THE INVENTION

The present invention is directed to an image forming system capable of, without requiring various sensors, obtaining optimum image forming control information in accordance with types of sheets that are set to an image forming apparatus and also capable of performing image forming under image forming conditions suitable to various types of sheets.

In one aspect of the present invention, an image forming apparatus that can communicate with a server that manages control information of the image forming apparatus via a network includes a sheet storing device configured to store a sheet having a wireless tag, a receiving device configured to receive information sent from the wireless tag, a communication device configured to obtain the control information from the server via the network based on the information received by the receiving device, and a controller configured to control an image forming condition based on the control information obtained by the communication device.

In another aspect of the present invention, an image forming system including an image forming apparatus that can be connected to a network and a server that manages control information of the image forming apparatus includes a sheet storing device that is provided in the image forming apparatus and is configured to store a sheet containing a wireless tag, a receiving device that is provided in the image forming apparatus and is configured to receive information sent from the wireless tag, a device type information sending device that is provided in the image forming apparatus and is configured to transmit device type information of the image forming apparatus to the server via the network based on the information received by the receiving device, a control information sending device that is provided in the server and is configured to transmit the control information to the image forming apparatus in accordance with the device type information sent from the device type information sending device, and a controller that is provided in the image forming apparatus and is configured to control an image forming condition based on the control information transmitted from the control information sending device.

In another aspect of the present invention, a program that causes an image forming apparatus that can be connected to a server that manages control information of the image forming apparatus via a network includes a receiving step of receiving information sent from a wireless tag contained in a sheet stored in a sheet storing device of the image forming apparatus, a communication step of obtaining the control information from the server via the network based on the information received by the receiving step, and a control step of controlling an image forming condition based on the control information obtained by the communication step.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 16A through 16D are schematic diagrams illustrating various exemplary methods for arranging wireless tags according to the third embodiment of the present invention.

DETAILED DESCRIPTION OF THE EMBODIMENTS

Exemplary embodiments, various features and aspects of the present invention will now be described in detail hereinbelow in accordance with the accompanying drawings.

First Exemplary Embodiment

A first exemplary embodiment of an image forming system according to the present invention is described with reference to the drawings.

Here, in the explanation as to the embodiments of the present invention, an image forming apparatus includes apparatuses such as a copying machine, a laser beam printer, a facsimile machine, and a multifunction machine having a copying function, a printer function, a facsimile function, and the like. In addition, in the description of the embodiments below, an explanation is made as to a color image forming apparatus as an example. However, the present invention can also be applied to a monochromatic image forming apparatus.

FIGS. 1 through 7 show an exemplary image forming system according to the first embodiment of the present invention.

Figure 1:
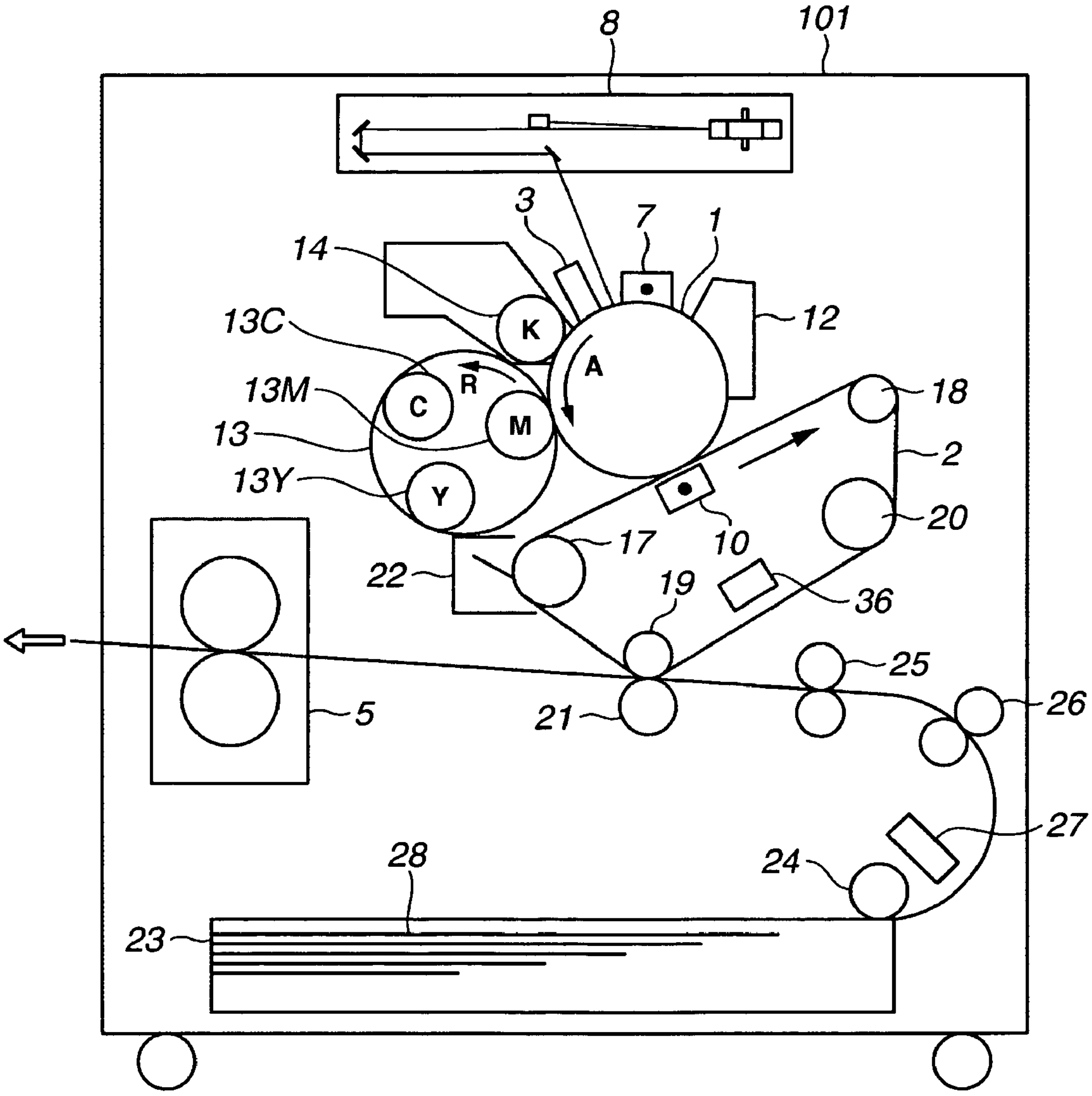
FIG. 1 is across section of an image forming apparatus according to a first exemplary embodiment of the present invention.

First, FIG. 1 is a cross section of an exemplary printer unit of the image forming apparatus. More specifically, FIG. 1 shows an exemplary color image forming apparatus having an intermediate transfer member. A photosensitive member drum (hereinafter simply referred to as a photosensitive member) 1 is provided so as to be rotated by a motor (not shown) in the direction of an arrow A in FIG. 1. There are disposed around the photosensitive member 1 a primary charging device 7, an exposure device 8, a potential sensor 3, a black developing device 14, a color developing device 13, a transfer charging device 10, and a cleaner device 12.

A developing device is constituted by the color developing device 13 for full-color development and the black developing device 14 that is fixed to the photosensitive member 1 in constant contact therewith. The color developing device 13 is constituted by a rotation developing device that includes a Y developing device 13Y, an M developing device 13M, and a C developing device 13C. Each of the developing devices 13Y, 13M, 13C, and 14 develops a latent image on the photosensitive member 1, using Y, M, C, and K toners, respectively. In developing each colors of Y, M, and C, the color developing device 13 is rotated by a motor (not shown) in the direction of an arrow R in FIG. 1 so that the developing device corresponding to each color is brought into contact with the photosensitive member 1. In the black developing device 14, a development roller is in constant contact with the photosensitive member 1. In developing each color other than black (K), a high-voltage bias of the black developing device 14 is controlled so that the K toner is not developed, while in developing the black (K) color, a high-voltage bias output is switched to be adjusted to a level at which the K toner can be developed, and thus the K toner is developed.

The toner image of each color developed onto the photosensitive member 1 is serially transferred by the transfer charging device 10 onto a belt 2 that is an intermediate transfer member, and thus the toner images of the four colors are superposed. The belt 2 is looped around rollers 17, 18, 19, and 20. Among the rollers 17, 18, 19, and 20, the roller 17 is joined to a driving source (not shown) so as to function as a drive roller that rotates the belt 2. Each of the rollers 18 and 20 functions as a tension roller for adjusting a tension of the belt 2. The roller 19 functions as a backup roller of a transfer roller 21 that is a secondary transfer device.

A belt cleaner 22 is provided at a position opposing the roller 17 over the belt 2. The belt cleaner 22 wipes of the toners remaining on the belt 2 with a blade. A sheet cassette 23 is mounted with sheets 28. A sheet 28 that is fed into a conveyance path by a pickup roller 24 passes through a position opposite to a receiving device 27. Then, the sheet 28 is fed by roller pairs 26 and 25 to a nip portion, namely, a contacting portion between the secondary transfer device 21 and the belt 2. A toner image formed on the belt 2 is transferred onto the sheet 28 at the nip portion, and then thermally fixed onto the sheet 28 by a fixing unit 5. After that, the sheet 28 onto which the toner image has been fixed is discharged out of the image forming apparatus.

In a color printer according to the above constitution, an image is formed in a manner as described below. Namely, first, a voltage is applied to the primary charging device 7 so as to electrically negatively charge a surface of the photosensitive member 1 in an even manner with a given potential of a charging unit. Sequentially, the exposure device 8 constituted by a laser scanner performs an exposure so that an image portion on the photosensitive member 1 that is electrically charged is charged at a given exposure unit potential, and thus a latent image is formed. The exposure device 8 forms a latent image corresponding to an image by switching between an on state and an off state based on an image signal.

Each of the developing rollers such as the developing device 13Y is applied with a developing bias that is previously set for each color. The latent image is developed with toner while passing through a position of each corresponding developing roller. Then, the developed latent image is visualized as a toner image. The toner image is transferred onto the belt 2 by the transfer charging device 10, and further, is transferred onto the sheet by the secondary transfer device 21. After that, the sheet onto which the toner image has been formed is fed to the fixing device 5. In the case of full-color printing, toners of the four colors are superposed onto the belt 2, and the toner image is transferred onto the sheet. After that, the sheet onto which the toner image has been formed is discharged out of the image forming apparatus.

The toner remaining on the surface of the photosensitive member 1 is removed and recovered from the surface by the cleaner device 12. After that, lastly in one image forming cycle, the photosensitive member 1 is electrically discharged to a level nearly equivalent to 0 volt, in an even manner by a discharging device (not shown), to be ready for the next image forming cycle.

Figure 2:
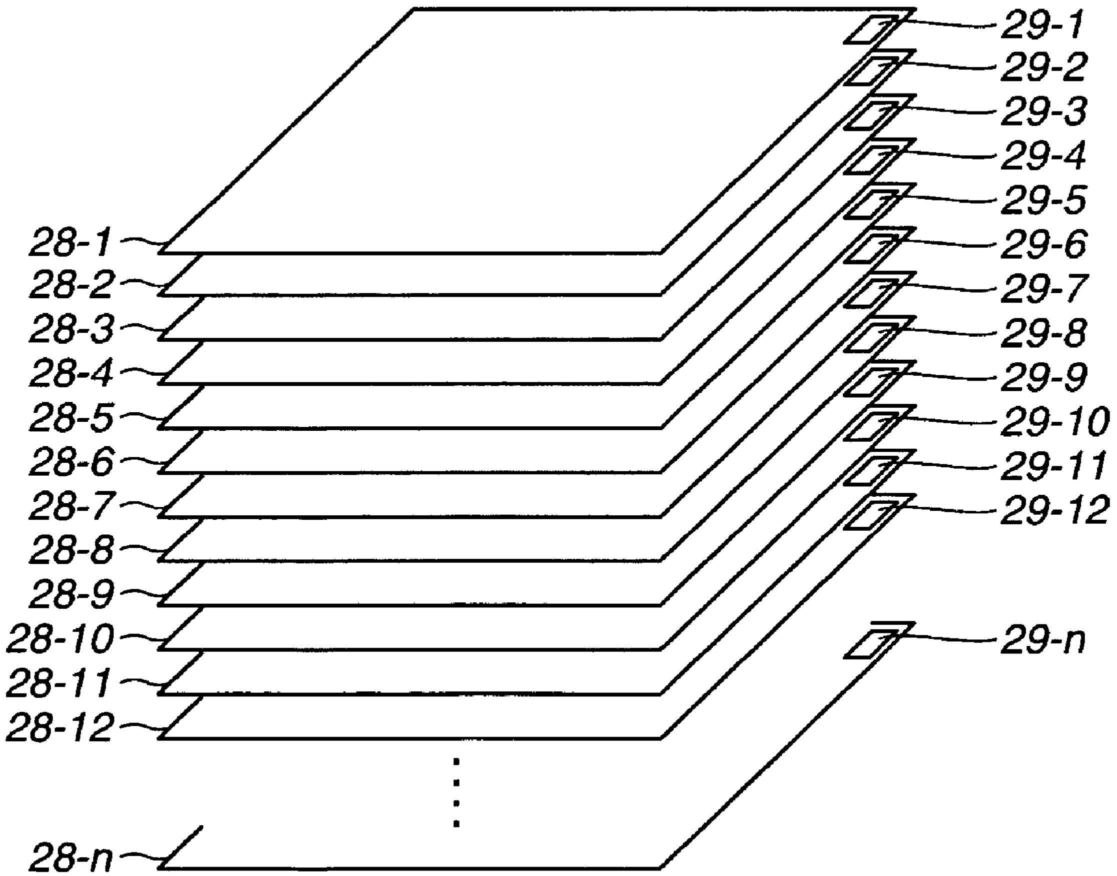
FIG. 2 is a schematic diagram of a plurality of exemplary sheets according to the first embodiment of the present invention.

Here, an explanation is made, with reference to FIG. 2, as to the sheet 28 that is installed and mounted to the image forming apparatus shown in FIG. 1. FIG. 2 shows a state of the sheet 28 mounted in the sheet cassette 23. Evenly stacked n (n is an integer) sheets 28-1 through 28-n are mounted with small wireless tags (for example, IC tips, IC tags, RFID tags, RF-tags, and the like) 29-1 through 29-n, one for one sheet. In addition, each of the wireless tags 29 previously stores an address (IP address or the like) in which control information for performing an optimum image formation in performing the image formation using the sheet 28 is stored. More specifically, if the same sheets (namely, the sheets of the same type, size, and thickness) are used for the image formation, the same IP address is stored with respect to each of all such sheets.

Note that the control information is stored in a server on a network, and one specific address, among a plurality of IP addresses that the server stores, is allocated as an address in which the control information for one specific sheet 28 is stored.

Figure 3:
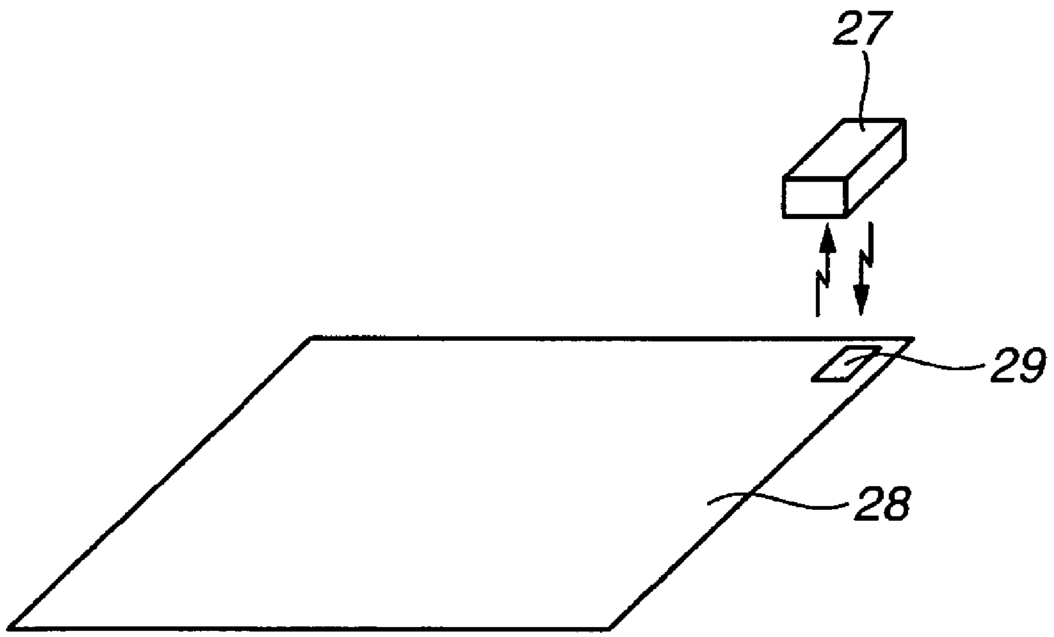
FIG. 3 is a schematic diagram showing a state of a wireless communication performed between a wireless tag and a receiving device according to the first embodiment of the present invention.

Further, in the image forming apparatus shown in FIG. 1, when the sheet 28 is drawn and fed by the pickup roller 24 into the conveyance path and comes close to the receiving device 27, the wireless tag 29 of the sheet 28 is activated by electromagnetic wave energy generated by and emitted from the receiving device 27, as shown in FIG. 3. Thus, the receiving device 27 can perform a wireless communication with the wireless tag 29, and receives the IP address that the wireless tag 29 previously stores.

Figure 4:
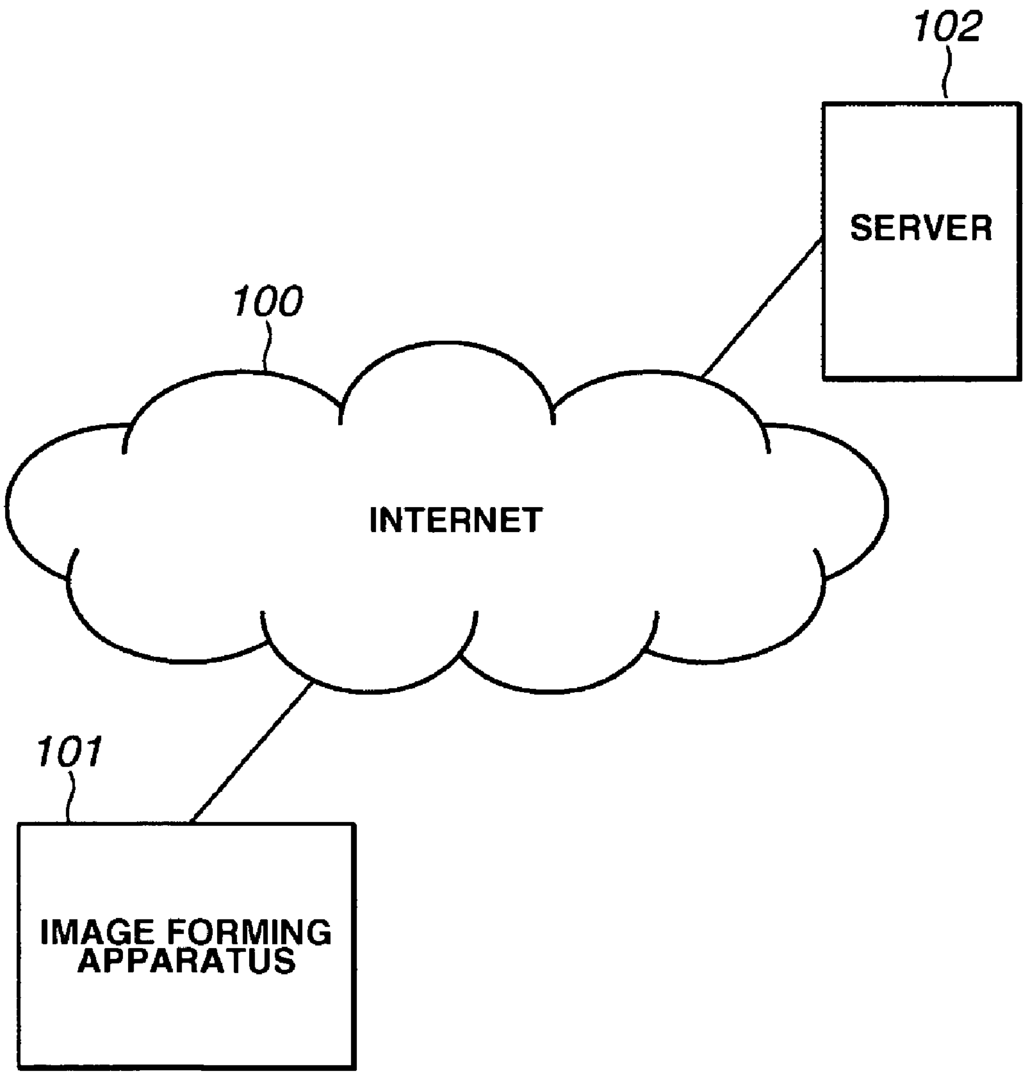
FIG. 4 is a schematic diagram showing an exemplary image forming system according to the first embodiment of the present invention.

As shown in FIG. 4, the image forming apparatus 101 shown in FIG. 1 is connected to the Internet 100. In addition, a server 102 that stores the control information corresponding to each sheet is also connected to the Internet 100.

Figure 5:
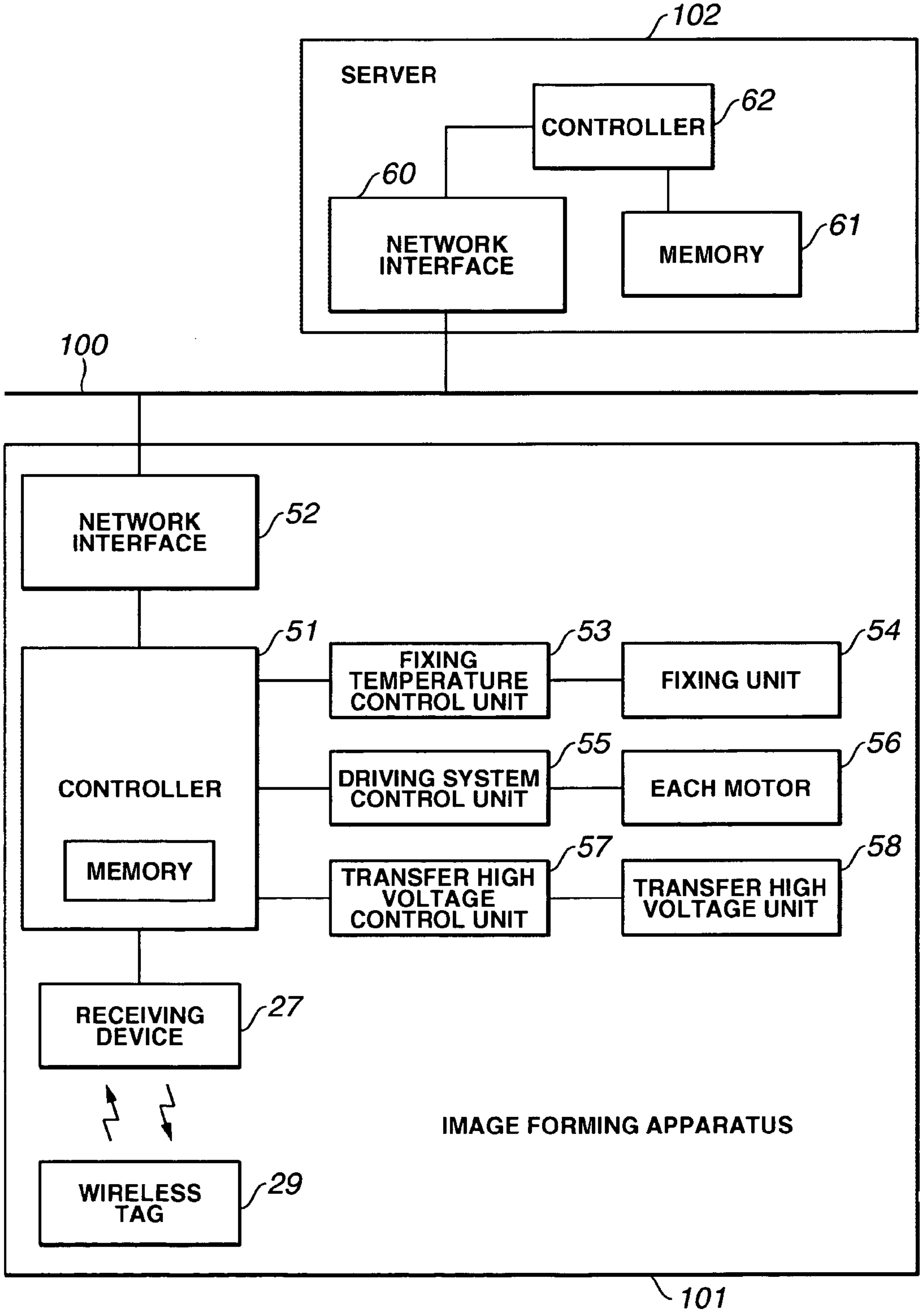
FIG. 5 is a block diagram of the exemplary image forming system according to the first embodiment of the present invention.

FIG. 5 is a block diagram of the image forming apparatus 101 and server 102 connected to the Internet 100 from FIG. 4. In FIG. 5, a controller 51 performs each control with respect to the image forming apparatus 101. A network interface 52 that is connected to the controller 51 is an interface for connecting to the Internet 100 on the basis of an instruction issued by the controller 51. Further, a fixing temperature control unit 53 that is connected to the controller 51 is a control unit for controlling a fixing unit 54 to a given temperature on the basis of a value instructed by the controller 51. A driving system control unit 55 is a control unit for controlling each motor 56 to be rotated at a given rotational frequency by a given sequence, on the basis of a value instructed by the controller 51. A transfer high voltage control unit 57 is a control unit for controlling a high voltage output generated by a transfer high voltage unit 58 on the basis of a value instructed by the controller 51.

Note that the image forming apparatus 101 is constituted by various kinds of units and control units that are not shown in the drawing, as well as those mentioned above. However, portions of the image forming apparatus 101 that are not related to the description of this embodiment are omitted from the explanation.

The server 102 is controlled by a controller 62 with respect to the control of an inside mechanism of the server 102. The server 102 is connected to the Internet 100 via a network interface 60. A memory 61 stores therein a plurality of IP addresses, and in addition, stores, in each IP address, information of a sheet to which the IP address is allocated. The memory 61 further stores control information for performing optimum image forming in forming an image by using each of the sheets allocated with the IP address. In addition, the server 102 operates so that the plural IP addresses that are stored in the memory 61 provided to the server 102 serve as IP addresses with which the server 102 is connected to the Internet 100.

Note that the server 102 is constituted by various kinds of units and control units that are not shown in the drawing, as well as those mentioned above. However, portions of the server 102 that are not related to the description of this embodiment are omitted from the explanation.

Table 1 below shows one example of each IP address that the memory 61 of the server 102 stores, the information of the sheet 28 to which the stored IP address is allocated, and further, the control information for performing optimum image forming in forming an image by using the sheet allocated with the IP address.

Note that in Table 1, an IP address column shows the IP address that the server 102 is provided with, and each such address is allocated to each sheet, and the information of the sheet allocated with such information is described in sheet information columns. Further, the control information (including an image formation speed ratio, a transfer high voltage output, and fixing temperature settings) in using the sheet in each apparatus model is stored therein.

the controller 51 issues a request for access through the Internet to the obtained IP address (2001:200:ffff:1234:5678:9abc:def0:0002) via the network interface 52.

Meanwhile, the server 102 is operated by the network interface 60 so that the plural IP addresses that are stored in the memory 61 provided to the server 102 serve as IP addresses with which the server 102 is connected to the Internet 100. Thus, the server 102 starts a communication upon the request for the access to the obtained IP address from the image forming apparatus 101. Then, first, the image forming apparatus 101 transmits device information (namely, the model name C002).

Next, image forming speed (processing speed) information (1: normal speed), transfer high voltage output information (set at 2,250 V), and fixing temperature information (set at 210° C.) at the time the image forming apparatus 101 (model name C002) uses the sheet 28 (2001:200:ffff:1234:5678:9abc:def0:0002) are sent from the server 102 to the image forming apparatus 101. Then, the image forming apparatus

TABLE 1

| | | Control Information | | | Sheet Information | | | |
|---|---|---|---|---|---|---|---|---|
| IP Address | Model Name | Image Forming Speed Ratio | Transfer High Voltage Output [V] | Fixing Temperature Setting [° C.] | Name of Manufacturer | Size | Type | Thickness [mm] |
| 001:200:ffff:1234:5678:9abc:def0:000 | C001 | 1 | 2410 | 180 | Company | A3 | Thin | 0.08 |
| | P001 | 1 | 2160 | 176 | A | | | |
| | P003 | 1 | 2660 | 180 | | | | |
| | F005 | 1 | 1660 | 167 | | | | |
| 001:200:ffff:1234:5678:9abc:def0:000 | C001 | 1 | 2500 | 200 | Company | A4 | Plain | 0.11 |
| | C002 | 1 | 2250 | 210 | B | | | |
| | P001 | 1 | 2250 | 195 | | | | |
| | P003 | 1 | 2750 | 200 | | | | |
| | F001 | 1 | 2000 | 190 | | | | |
| | F005 | 1 | 1750 | 185 | | | | |
| 001:200:ffff:1234:5678:9abc:def0:000 | C001 | 1 | 2770 | 218 | Company | B4 | Thick | 0.2 |
| | C002 | 1 | 2520 | 229 | C | | | |
| | P001 | 1 | 2520 | 213 | | | | |
| | F005 | 1 | 2020 | 202 | | | | |
| 001:200:ffff:1234:5678:9abc:def0:000 | C001 | ½ | 3130 | 222 | Company | B5 | Thick | 0.32 |
| | C002 | ½ | 3210 | 230 | D | | | |
| | P003 | ½ | 2990 | 222 | | | | |
| | F001 | ½ | 2630 | 211 | | | | |
| 001:200:ffff:1234:5678:9abc:def0:000 | C001 | ½ | 2500 | 200 | Company | A4 | Glossy | 0.13 |
| | C002 | ½ | 2250 | 210 | C | | | |
| | P003 | ½ | 2750 | 200 | | | | |
| | F001 | ½ | 2000 | 190 | | | | |
| 001:200:ffff:1234:5678:9abc:def0:000 | C001 | ¼ | 2000 | 190 | Company | A4 | OHP | 0.11 |
| | P003 | ¼ | 2200 | 190 | A | | | |
| | F005 | ¼ | 1400 | 176 | | | | |
| . | . | . | . | . | . | . | . | . |
| . | . | . | . | . | . | . | . | . |
| . | . | . | . | . | . | . | . | . |

Next, an explanation is made as to the operation of the image forming apparatus 101 and the server 102 with reference to FIG. 5 and Table 1. For example, suppose that an A4-size sheet manufactured by a sheet manufacturer company B, which is a plain paper of a thickness of 0.11 mm is set to the image forming apparatus 101 (model name C002). Here, the wireless tag 29 mounted on the sheet previously stores the IP address (2001:200:ffff:1234:5678:9abc:def0:0002).

Then, when the receiving device 27 receives the IP address (2001:200:ffff:1234:5678:9abc:def0:0002) that the wireless tag 29 stores as described above, the receiving device 27 transmits the obtained IP address to the controller 51. Upon the transmission of the IP address by the receiving device 27, 101 issues an instruction of a control value to each control unit on the basis of each obtained information to change set values. Thus, the image forming is controlled to be performed in a manner suitable to and optimum for the sheet 28.

Further, the memory provided within the controller 51 stores the obtained control information as well as the IP address. Thus, if the same sheet is mounted into the sheet cassette 23, a user or an operator can change each setting by using the image forming apparatus 101, without connecting the image forming apparatus 101 to the server 102.

Figure 6:
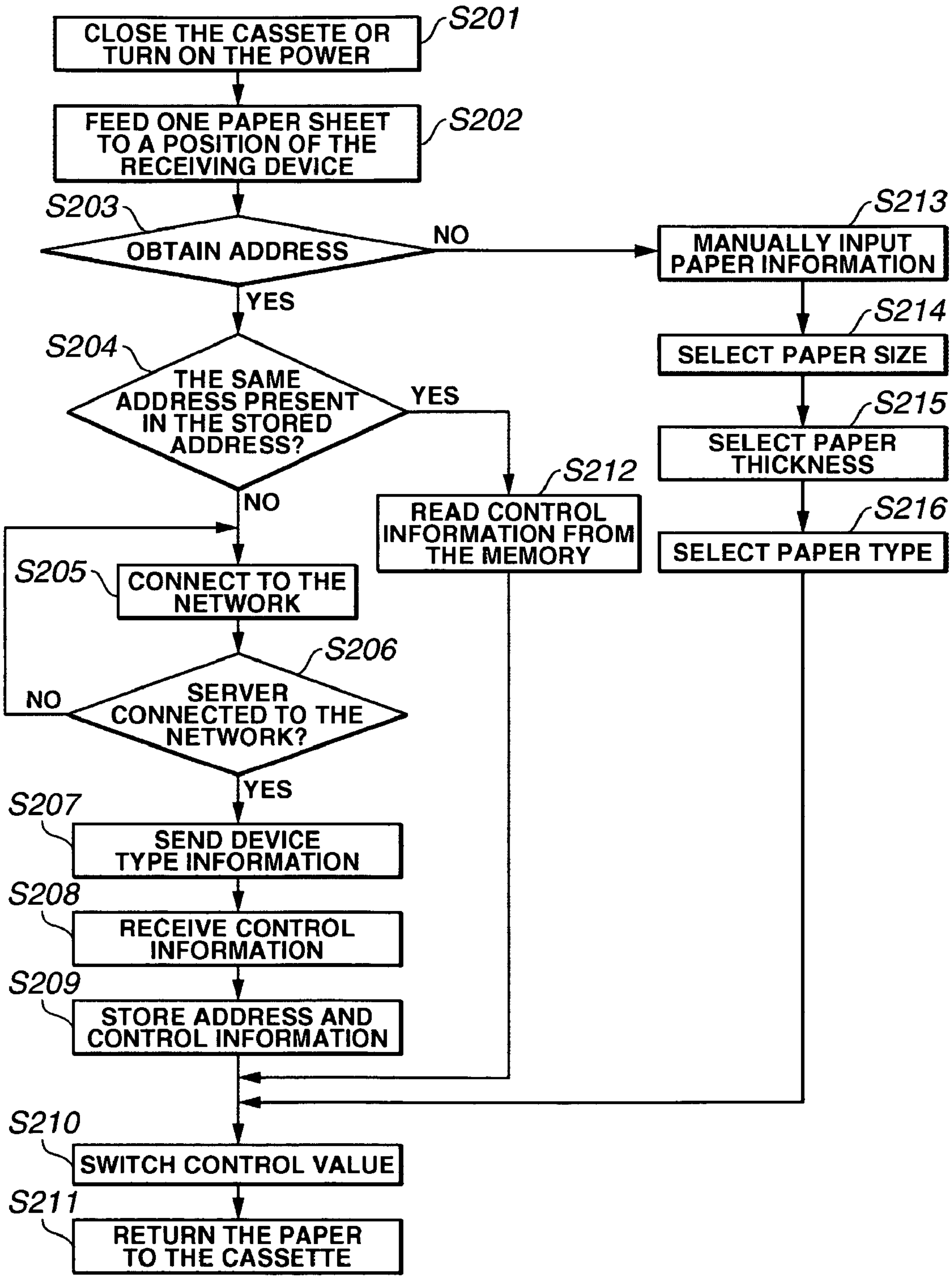
FIG. 6 is a flow chart showing an exemplary operation for obtaining control information according to the first embodiment of the present invention.

Next, an explanation is made as to a timing at which the image forming apparatus 101 obtains the control information, with reference to a flow chart shown in FIG. 6. When the user sets the sheet 28 into the sheet cassette 23 of the image forming apparatus 101, the user pulls out the sheet cassette 23 in the direction of a front side in FIG. 1, and thus the user mounts the sheet 28 into the sheet cassette 23. Then, after that, the user pushes back the sheet cassette 23 and stores the sheet cassette 23 into the image forming apparatus 101.

The image forming apparatus 101 recognizes that the sheet 28 is changed at the timing at which the sheet cassette 23 is closed, and obtains the control information with considering the closure of the sheet cassette 23 as a trigger. When the sheet cassette 23 is closed (step S201) in FIG. 1, the pickup roller 24 of the image forming apparatus 101 is rotated, and thus the sheet 28 is conveyed to a position of the receiving device 27 (step S202).

Next, the receiving device 27 starts a wireless communication with the wireless tag 29 to obtain the IP address (step S203). If the IP address is obtained by the receiving device 27, the controller 51 confirms whether the obtained IP address has already been stored in the memory of the controller 51 or not (step S204). If it is confirmed that the obtained IP address has not yet been stored in the memory of the controller 51 yet, the controller 51 connects the image forming apparatus 101 to the Internet 100 (step S205), and issues a request for connection to the obtained IP address (server 102) (step S206). The request for connection is repeated until the connection to the server 102 is completely established.

After the connection to the server 102 is completely established, the image forming apparatus 101 transmits device type information to the server 102 (step S207). Upon receiving of the information from the image forming apparatus 101, the server 102 transmits the stored control information to the image forming apparatus 101 on the basis of the above IP address and the device type information, and then the image forming apparatus 101 receives the transmitted control information (step S208). Then, the image forming apparatus 101 stores the received control information and IP address in the memory within the controller 51 by relating the control information with the IP address to form a database of the stored control information and the IP address, and further, stores the received IP address in the memory within the controller 51, as information related to the sheet that is currently mounted in the cassette 23 (step S209). After that, the image forming apparatus 101 switches each control value on the basis of the obtained control information (step S210). Then, the sheet is returned to the cassette 23, and thus the control information is completely obtained by the image forming apparatus 101 (step S211).

On the other hand, if the IP address is not obtained by the receiving device 27 in step S203, a message to that effect is displayed by an operation unit (not shown), thus prompting the user to manually input the sheet information (step S213). After a selection of the sheet size (step S214), a selection of the sheet thickness (step S215), and a selection of the sheet type (step S216) by the user are completed, the image forming apparatus 101 selects the control value on the basis of the inputted information and switches the control values (step S210). Then, the sheet is returned to the cassette 23, and the processing ends (step S211).

Further, in a case where the IP address obtained in step S204 has already been stored in the memory, the image forming apparatus 101 reads the control information corresponding to the IP address from the memory (step S212), then switches the control values on the basis of the read information (step S210). After that, the sheet is returned to the cassette 23, and the processing ends (step S211).

Figure 7:
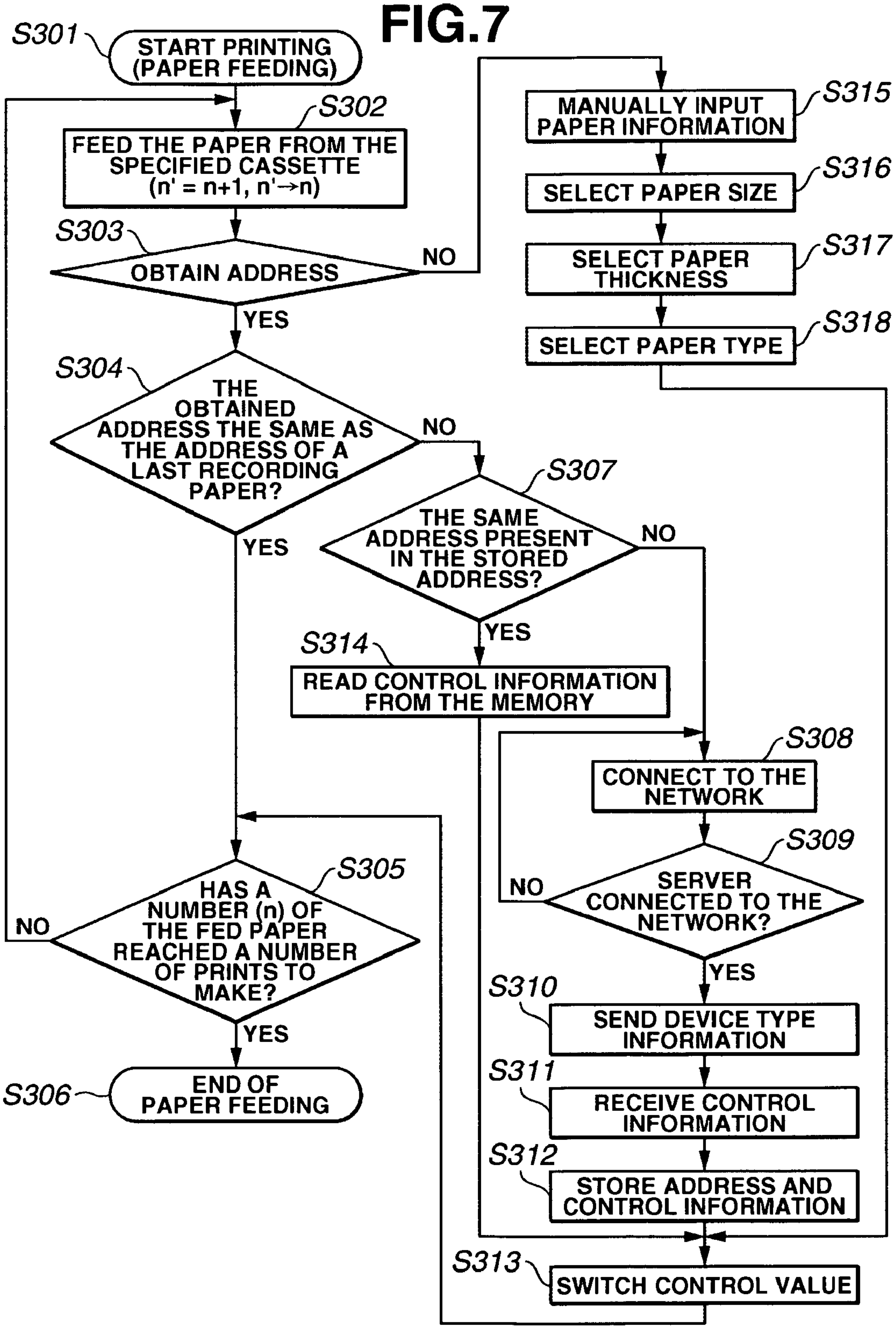
FIG. 7 is a flow chart showing an exemplary operation for obtaining control information according to the first embodiment of the present invention.

Next, the confirmation of a sheet during an image forming operation is explained with reference to FIG. 7. Typically, the sheets mounted in the image forming apparatus are set into the sheet cassette in a bundle of sheets. Accordingly, the sheets of the same size, thickness, and the like are serially fed. However, if the sheets of a different size, thickness, and the like are added during the image forming operation, the size, thickness, and the like of the sheets are changed during the image forming operation. To prevent this, the image forming apparatus 101 confirms the address provided to and stored in the sheet 28 upon every feeding of the sheet.

When a print order of an m number of prints is issued, the image forming is started and the feeding of the sheet starts (step S301). Then, one sheet 28 is fed from the sheet cassette 23 (step S302). In this feeding operation, the feeding is started from a state where n=0. Then, n+1 (n'=1) is set to n', and n is substituted by n' (n=1). That is, n=the number of fed sheets. Next, the receiving device 27 starts the wireless communication with the wireless tag 29 and obtains the IP address (step S303).

If the IP address is not obtained by the receiving device 27 in step S303, a message to that effect is displayed by an operation unit (not shown), prompting the user to manually input the sheet information (step S315). After a selection of the sheet size (step S316), a selection of the sheet thickness (step S317), and a selection of the sheet type (step S318) by the user are completed, the image forming apparatus 101 selects the control value on the basis of the inputted information and switches the control values (step S313).

If the IP address is obtained in step S303, the image forming apparatus 101 compares the obtained IP address with the IP address of a last sheet (step S304). If it is confirmed by the image forming apparatus 101 that the obtained IP address is the same as the IP address of the last sheet, the control value is not changed, and then the image forming apparatus 101 confirms whether the number of fed sheets (n) has reached the number of print requests (m) (step S305). If it is determined that the number of fed sheets (n) has not reached the number of print requests (m), the next sheet 28 is fed (step S302). The feeding of sheets is repeated until the number of fed sheets n reaches m. When the number of fed sheets n reaches m (Yes in step S305), the feeding of sheets ends (step S306).

On the other hand, if the IP address different from the IP address of the last sheet is obtained in step S304, the image forming apparatus 101 confirms whether the obtained IP address has already been stored in the memory of the controller 51 or not (step S307). If it is confirmed that the obtained IP address has not yet been stored in the memory of the controller 51, the controller 51 connects the image forming apparatus 101 to the Internet 100 (step S308), and issues a request for connection to the obtained IP address (server 102) (step S309). The request for connection is repeated until the connection to the server 102 is completely established. After the connection to the server 102 is completely established, the image forming apparatus 101 transmits device type information to the server 102 (step S310).

Upon receiving of the information from the image forming apparatus 101, the server 102 transmits the stored control information to the image forming apparatus 101 on the basis of the above IP address and the device type information, and then the image forming apparatus 101 receives the transmitted control information (step S311). Then, the image forming apparatus 101 stores the received control information and IP address in the memory within the controller 51 by relating the control information with the IP address to form a database of the stored control information and the IP address, and further, stores the received IP address in the memory within the controller 51, as information related to the sheet that is currently mounted in the cassette 23 (step S312). After that, the image forming apparatus 101 switches each control value on the basis of the obtained control information (step S313).

After that, the image forming apparatus 101 confirms whether the number of fed sheets (n) has reached the number of print requests (m) (step S305). If it is determined that the number of fed sheets (n) has not reached the number of print requests (m), the next sheet 28 is fed. The feeding of sheets is repeated until the number of fed sheets n reaches m. When the number of fed sheets n reaches m (Yes in step S305), the feeding of sheets ends (step S306).

If in step S307 it is determined that the obtained IP address has already been stored in the memory of the controller 51, the image forming apparatus 101 reads control information corresponding to that IP address (step S314). The image forming apparatus 101 then switches the control values on the basis of the read information (step S313), and after that, the image forming apparatus 101 confirms whether the number of fed sheets (n) has reached the number of print requests (m) (step S305). If it is determined that the number of fed sheets (n) has not yet reached the number of print requests (m), the next sheet 28 is fed. The feeding of sheets is repeated until the number of fed sheets n reaches m. When the number of fed sheets n reaches m (Yes in step S305), the feeding of sheets ends (step S306).

Therefore, in the image forming system shown in FIG. 5, the image forming apparatus 101 can obtain from the server 102 the control information that is optimum and suitable for the sheets to be used, merely by updating to a latest state the IP address allocated for each sheet, the sheet information of the sheet, and the optimum control information in using the sheet in each device, which are stored in the memory 61 of the server 102. Thus, the image forming can be carried out under optimum image forming conditions based on the obtained control information.

As is explained above, in the image forming system according to the first embodiment, a plurality of sensors for detecting and determining the thickness, size, type, and the like of the sheets used in the image forming apparatus are not necessary. In addition, it is not necessary to previously store the information and the control information of the various sheets in the image forming apparatus. Thus, the image forming can always be performed under image forming conditions optimum and suitable to the sheets to be used. Further, the image forming can be performed under image forming conditions optimum and suitable to the sheets that are confirmed to be corresponding to the image forming apparatus after the image forming apparatus is marketed.

It is further noted that the information stored in the wireless tag 29 may be information for obtaining information related to a sheet from the server 102, and is not limited to the IP address.

Second Exemplary Embodiment

A second exemplary embodiment of an image forming system according to the present invention is explained with reference to the drawings.

Figure 8:
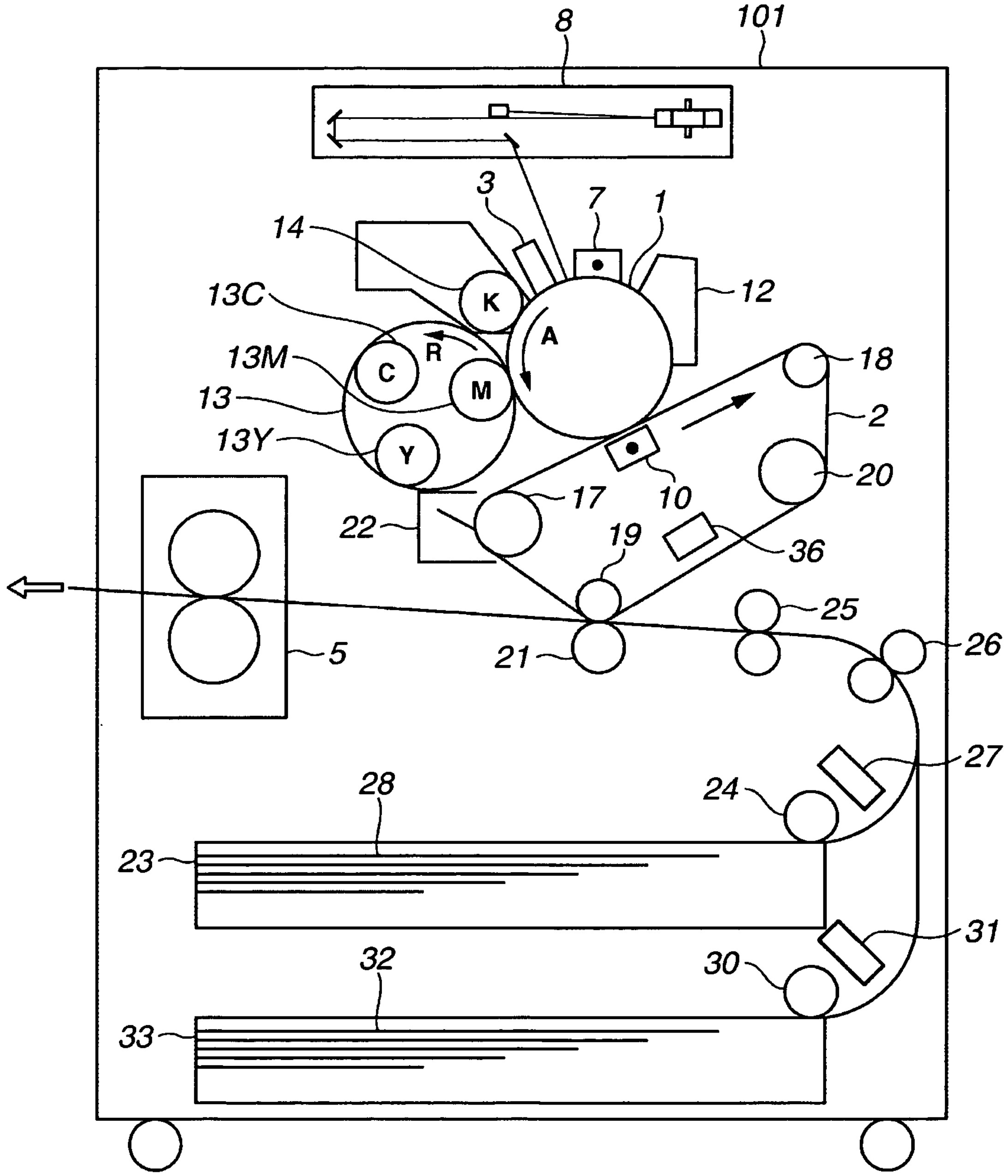
FIG. 8 is across section of an exemplary image forming apparatus according to a second embodiment of the present invention.
Figure 9:
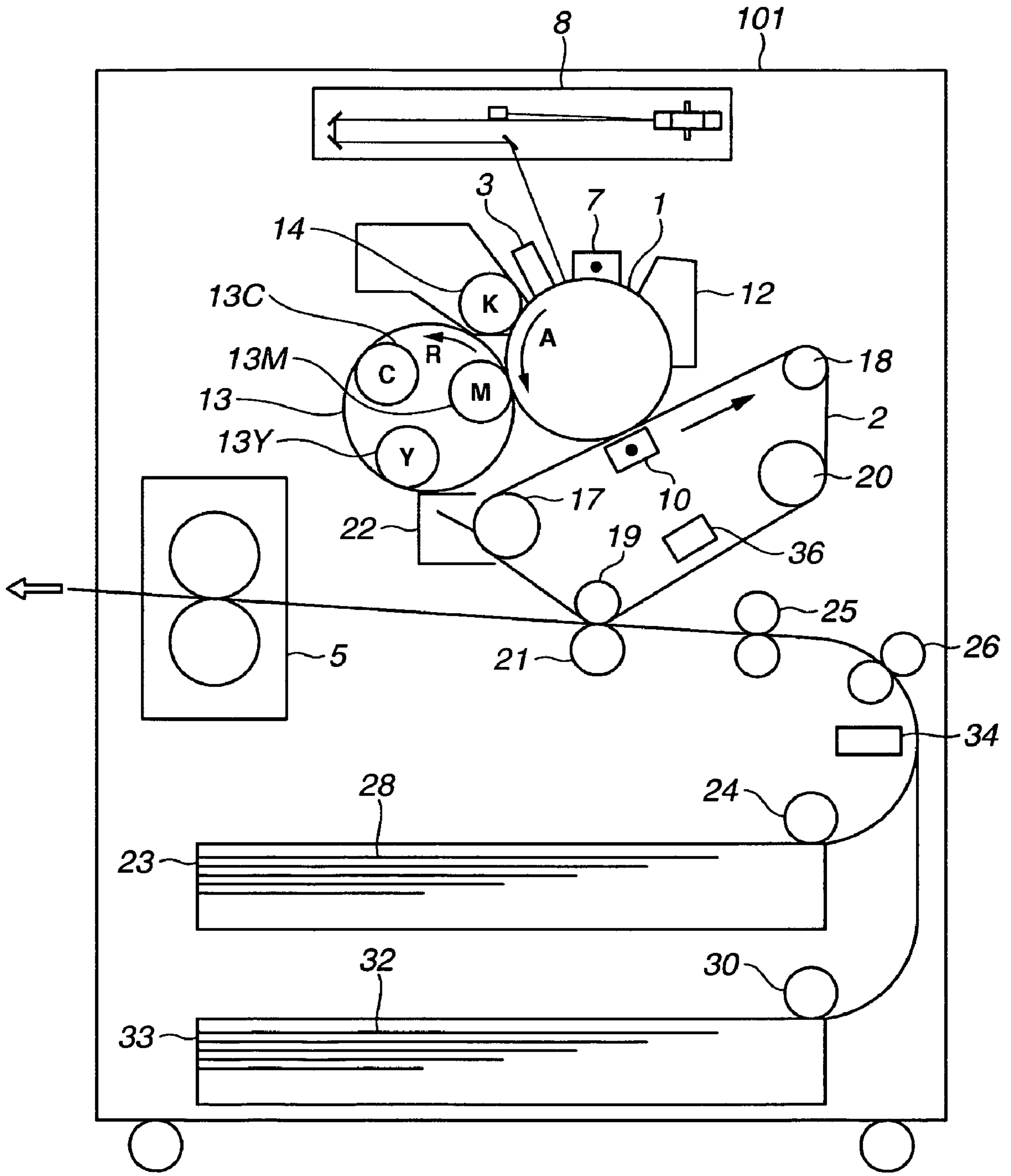
FIG. 9 is a cross section of the image forming apparatus according to the second embodiment of the present invention.

FIGS. 8 and 9 are cross sections showing a printer unit of the image forming apparatus according to the image forming system that is the second embodiment of the present invention. Note that a basic constitution of the second embodiment is similar the constitution of the first embodiment, and accordingly, the portions having the same constitution are provided with the same reference numerals and symbols, and the explanation thereof is not repeated here.

FIG. 8 shows an embodiment in which a plurality of sheet cassettes are provided and a same number of receiving devices are also provided. In FIG. 8, the printer unit is provided with two sheet cassettes, namely, a sheet cassette 23 and a sheet cassette 33. Reference numeral 30 denotes a pickup roller for the sheet cassette 33, and reference numeral 31 denotes a receiving device for the sheet cassette 33. The sheets 28 are stacked into the sheet cassette 23. The sheet 28 conveyed into the conveyance path by the pickup roller 24 passes through a position opposing the receiving device 27, and is then fed to a nip portion, namely a contacting portion between the secondary transfer device 21 and the belt 2, by the roller pairs 26 and 25. Likewise, The sheets 32 are stacked into the sheet cassette 33. The sheet 32 conveyed into the conveyance path by the pickup roller 30 passes through a position opposing the receiving device 31, and is then fed to a nip portion, namely a contacting portion between the secondary transfer device 21 and the belt 2, by the roller pairs 26 and 25.

In addition, the image forming apparatus 101 monitors the state of the sheet cassette 23 and the sheet cassette 33. When either one of the sheet cassettes 23 and 33 is opened or closed, the image forming apparatus 101 obtains the IP address stored in the wireless tag mounted on the sheet, on the basis of the flow chart shown in FIG. 6. Then, the image forming apparatus 101 obtains the control information from the server 102 via the network on the basis of the obtained IP address, and switches each control value.

Furthermore, when the power is on, the image forming apparatus 101 confirms the sheet size, thickness, type, and the like, with respect to each cassette in the same way as described above. The confirmation of the sheet during image forming is similar to that shown in FIG. 7.

As described above, the image forming apparatus according to this embodiment is provided with a plurality of sheet cassettes and a same number of receiving devices, and accordingly, the image forming apparatus 101 can obtain from the server 102 the control information that is optimum and suitable to the sheet to be used. Thus, the image forming can always be performed under optimum image forming conditions in accordance with the obtained control information.

FIG. 9 shows an embodiment in which a single receiving device is provided for a plurality of sheet cassettes. For example, in an apparatus of a type whose sheet conveyance speed is low or a type whose sheet conveyance length is long, the number of receiving devices can be reduced by providing a common receiving device on a conveyance path common to the plural sheet cassettes, without providing one receiving device for one sheet cassette in the vicinity of the sheet cassette.

In FIG. 9, the receiving device 34 is a receiving device common to the sheet cassette 23 and the sheet cassette 33. The receiving device 34 is disposed on a conveyance route (path) common to a sheet conveyance route (path) of the sheet cassette 23 and a sheet conveyance route (path) of the sheet cassette 33. The receiving device 34 monitors the state of the sheet cassette 23 and the sheet cassette 33, and when either of the sheet cassettes is opened or closed, obtains the IP address stored in the wireless tag mounted on the sheet, on the basis of the flow chart shown in FIG. 6. Then, the receiving device 34 obtains the control information from the server 102 via the network on the basis of the obtained IP address, and thus switches each control value.

In addition, when the power is on, the image forming apparatus 101 confirms the sheet size, thickness, type, and the like, with respect to each cassette in the same way as described above. The confirmation of the sheet during image forming is also similar as that shown in FIG. 7.

As described above, the image forming apparatus according to this embodiment is provided with a plurality of sheet cassettes and a same number of receiving devices, and accordingly, the image forming apparatus 101 can obtain from the server 102 the control information that is optimum and suitable to the sheet to be used. Thus, the image forming can always be performed under optimum image forming conditions in accordance with the obtained control information.

As is explained above, according to the second embodiment, a plurality of sensors for detecting and determining the thickness, size, type, and the like of the sheets used in the image forming apparatus are not necessary. In addition, the image forming apparatus can obtain the control information for the image forming that is optimum and suitable to the sheets set to the image forming apparatus. Further, the image forming can always be performed under image forming conditions optimum and suitable to the various sheets to be used. Also, the image forming can be performed under image forming conditions optimum and suitable to the sheets that are confirmed to be corresponding to the image forming apparatus after the image forming apparatus is marketed.

Third Exemplary Embodiment

Figure 10:
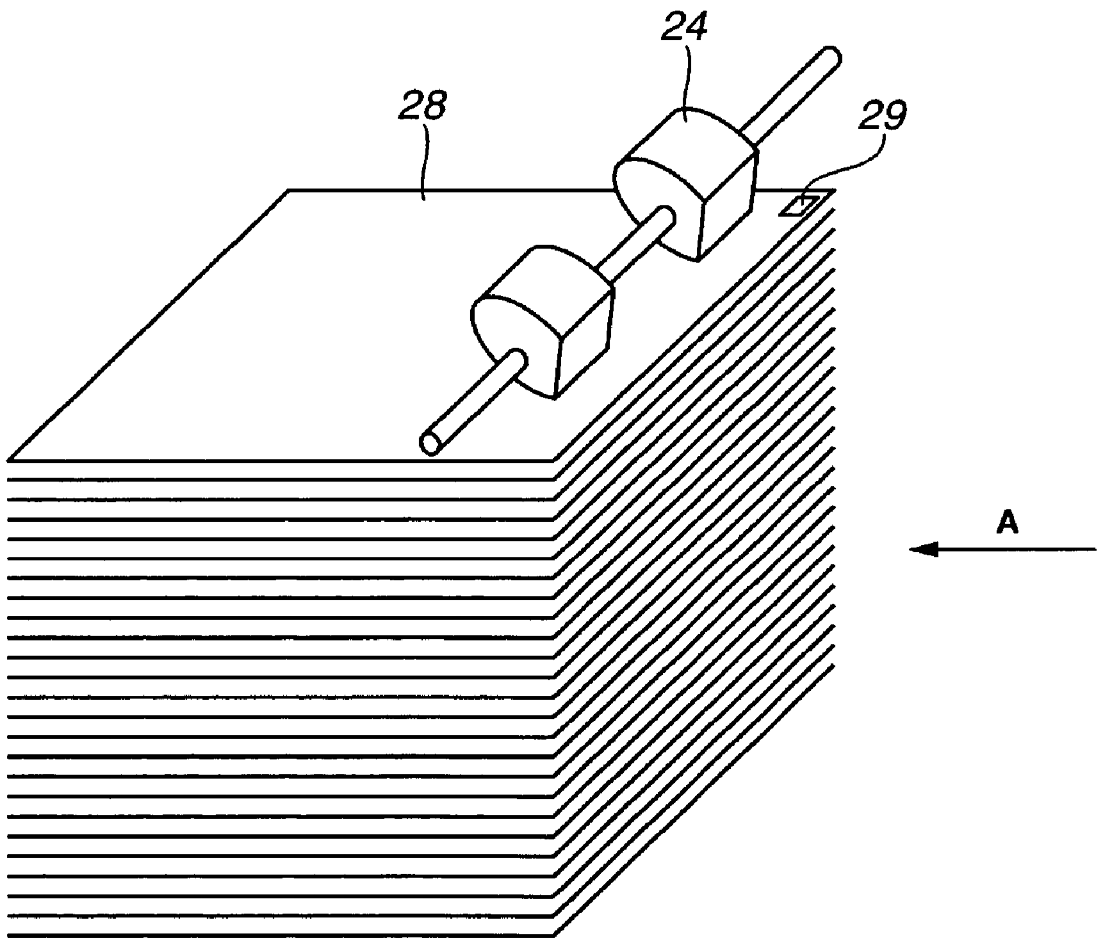
FIG. 10 is a schematic diagram illustrating a manner in which sheets are fed from a sheet cassette.

The pickup roller 24 mentioned above may be comprised by two rollers of a semi-circular shape whose one part is cut off, as shown in FIG. 10. In the sheet cassette 23, a bundle of the sheet 28 is lifted from a bottom of a feeding side (namely, the side an arrow A in FIG. 10 indicates) of a sheet 28 that is positioned at the bottom of the bundle of the sheet 28. Thus, the pickup roller 24 separates one sheet that is positioned at the top of the bundle of the sheet 28 stacked in the sheet cassette 23, and conveys the separated sheet 28 to the conveyance path.

Figure 11:
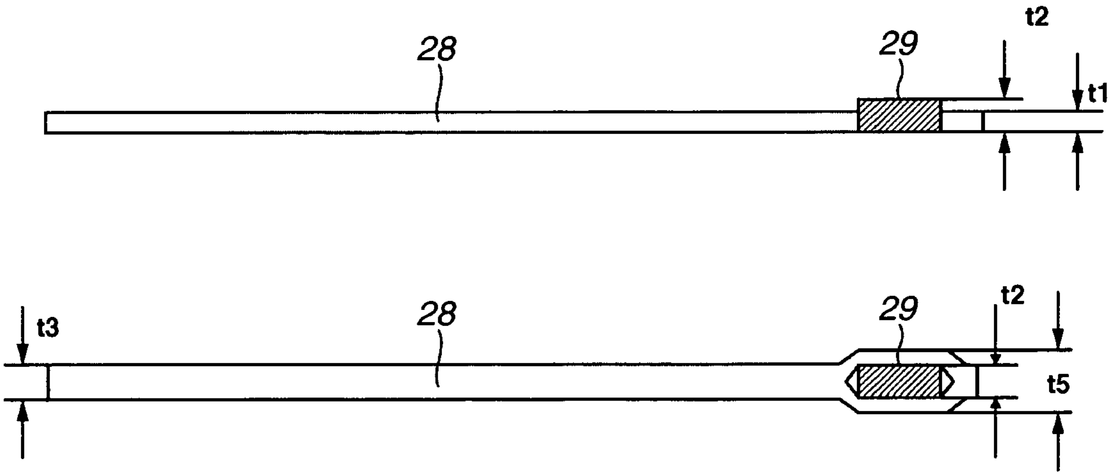
FIG. 11 is a schematic diagram illustrating a sheet containing an exemplary wireless tag in a case where the thickness of the sheet is smaller than the thickness of the wireless tag.

Here, with respect to a relationship between the thickness of the sheet 28 and the wireless tag 29, there is a case, for example, where a thickness t1 of the sheet 28 is smaller than a thickness t2 of the wireless tag 29, as shown in an upper part of FIG. 11. In addition, as shown in a lower part of FIG. 11, there is a case where the wireless tag 29 is mounted inside the sheet by holding the wireless tag 29 between sheet materials. In this case, a thickness t5 at a portion in which the wireless tag 29 is mounted differs from a thickness t3 of a portion in which the wireless tag 29 is not mounted. More specifically, the thickness t5 of the portion in which the wireless tag 29 is mounted is greater than the thickness t3 of a portion in which the wireless tag 29 is not mounted.

Figure 12:
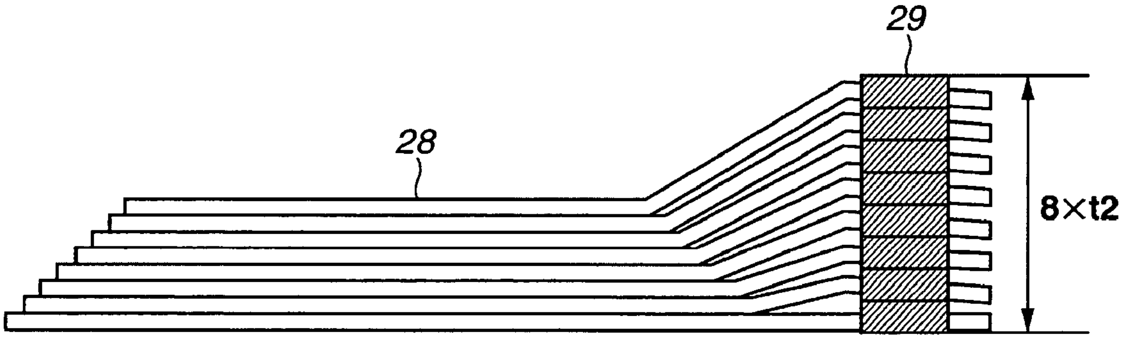
FIG. 12 is a schematic diagram illustrating a state in which a plurality of sheets containing a the wireless tag is stacked.

FIG. 12 shows a state where the bundle of the sheet 28 as shown in FIG. 11 is stacked into the sheet cassette 23. FIG. 12 shows such a state as viewed from a sheet feeder side. In this case also, the bundle of the sheet 28 is lifted from the bottom thereof. However, only the portion of the side of the bundle of the sheet 28 in which the wireless tag 29 is mounted (namely, the portion of the side with a greater thickness) is brought into contact with the pickup roller 24, and accordingly, the side of the bundle of the sheet 28 in which the wireless tag 29 is not mounted is not brought into contact with the pickup roller 24.

Accordingly, if the thickness of the sheet 28 is smaller than the thickness of the wireless tag 29, and when the sheet 28 having such thickness is stacked, the sheet 28 cannot be fed straight in a right direction by the pickup roller 24. To prevent this, the third embodiment is directed to carrying out a stable sheet feeding by using the bundle of sheets of a substantially uniformed thickness of the sheet even in a case where each sheet constituting the bundle of sheets is mounted with the wireless tag.

Figure 13:
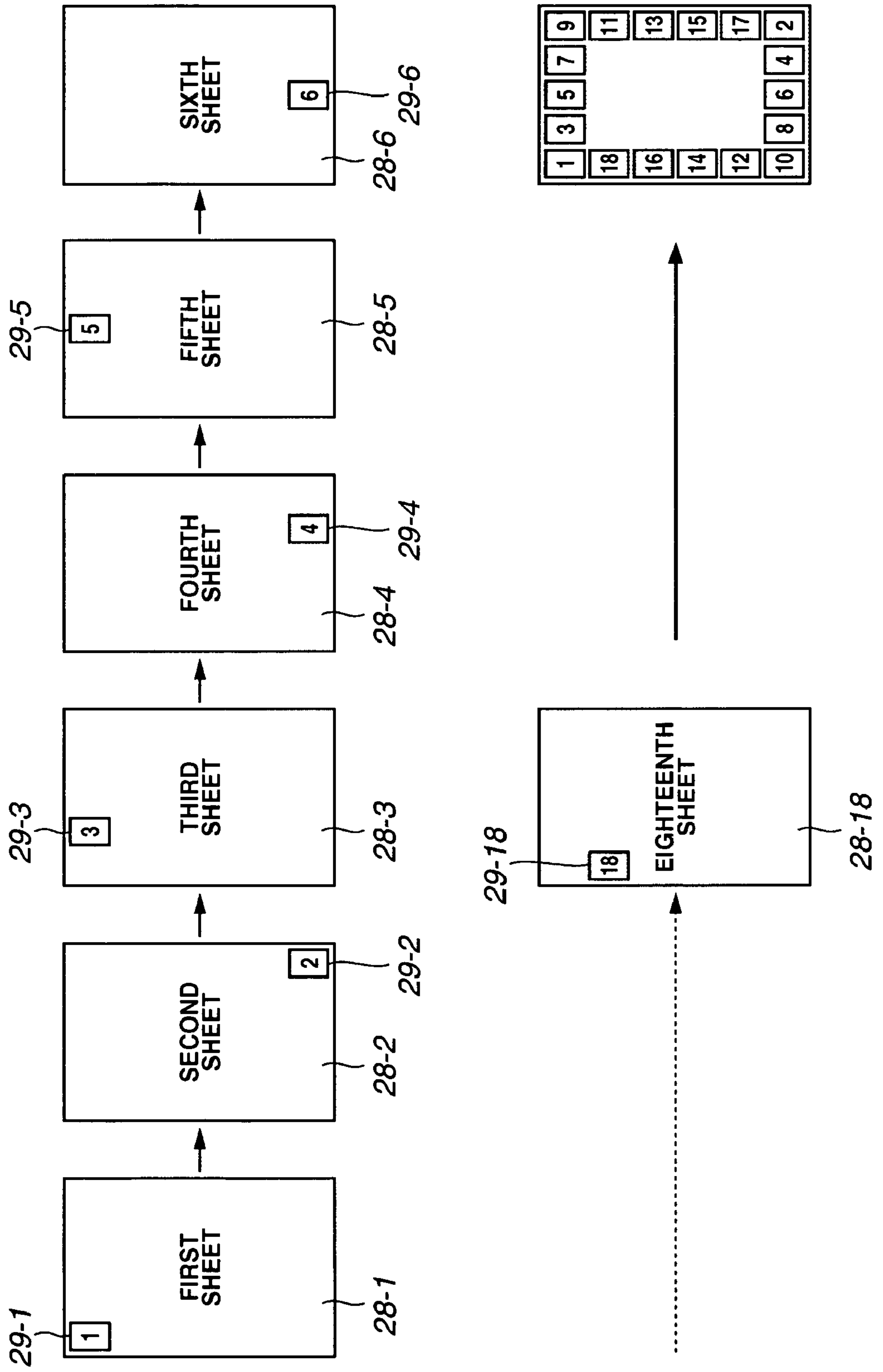
FIG. 13 is a schematic diagram illustrating a third exemplary embodiment of the present invention.

First, FIG. 13 shows an example of a method of disposing the wireless tag onto the sheet according to the third embodiment of the present invention. In FIG. 13, each of sheets 28-1 through 28-18 represents a corresponding first sheet through a corresponding eighteenth sheet. Each of the sheets 28-1 through 28-18 is mounted with a corresponding wireless tag 29-1 through a corresponding wireless tag 29-18. The first sheet 28-1 is mounted with the wireless tag 29-1 at an upper left corner thereof. The second sheet 28-2 is mounted with the wireless tag 29-2 at a lower right corner thereof. That is, the position at which the wireless tag 29-2 is mounted on the second sheet 28-2 is diagonal to the position at which the wireless tag 29-1 is mounted on the first sheet 28-1. The third sheet 28-3 is mounted with the wireless tag 29-3 at a position immediately right to the position at which the wireless tag 29-1 is mounted on the first sheet 28-1. The fourth sheet 28-4 is mounted with the wireless tag 29-4 at a position diagonal to the position at which the wireless tag 29-3 is mounted on the third sheet 28-3.

When each of the wireless tags is mounted on each corresponding sheet at positions mutually different in a small way and diagonal to a corresponding specific position, as described above, the positions at which the wireless tags are mounted on the corresponding sheets surround the circumference of the sheet when the wireless tag for the eighteenth sheet is correctly positioned and mounted on the sheet, as described in an example shown in FIG. 13. In this case, when the mount positions of the wireless tags, namely, the mount positions of the wireless tag 29-1 for the first sheet 28-1 through the wireless tag 29-18 for the eighteenth sheet 29-18, are overlapped on a single sheet, it can be recognized that all the wireless tags are mounted in mutually different positions, as shown in the lower right corner portion of FIG. 13.

Figure 14:
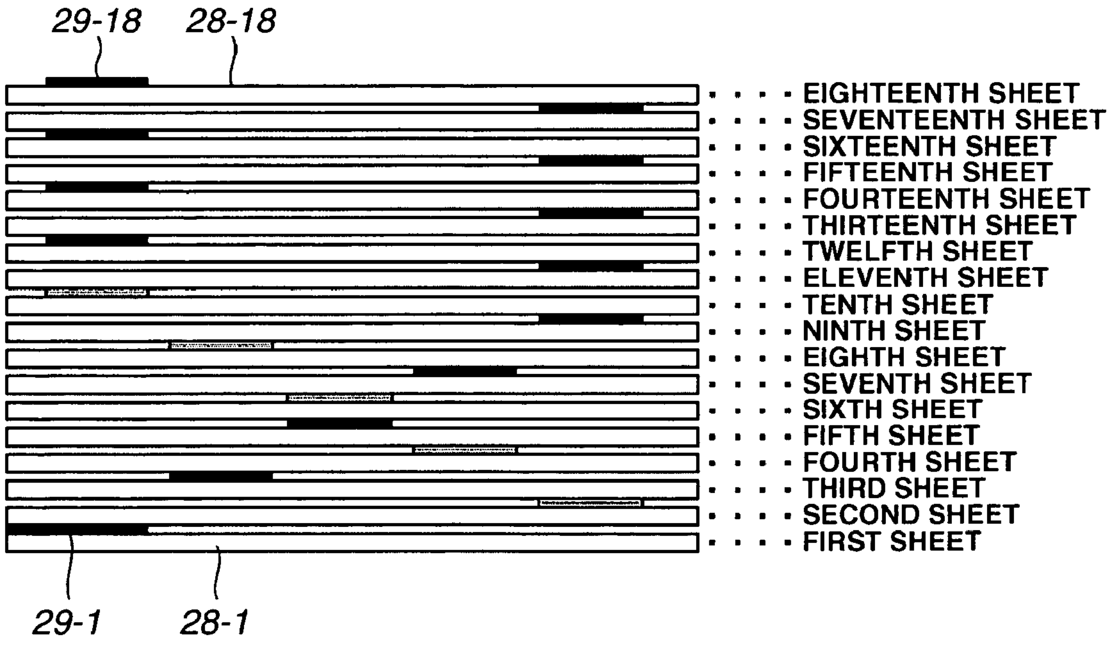
FIG. 14 is a schematic diagram illustrating a state in which sheets according to the third embodiment of the present invention are stacked.
Figure 15:
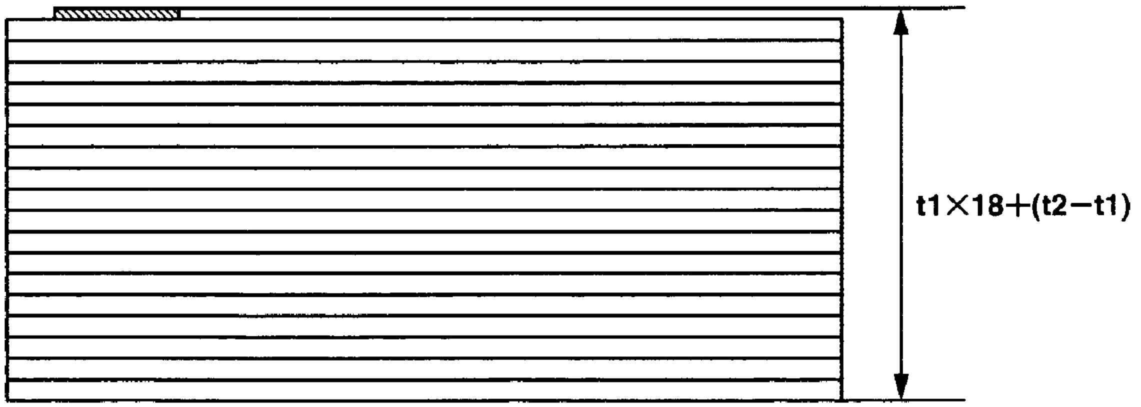
FIG. 15 is a schematic diagram illustrating a state in which sheets according to the third embodiment of the present invention are stacked.

In addition, FIG. 14 and FIG. 15 respectively show a state in a case where the thickness of the wireless tag is greater than the thickness of the sheet and when each wireless tag is positioned in the method as described above, and where the eighteen sheets are overlapped to each other.

FIG. 14 shows a state in a cross section where the bundle of the eighteen sheets as shown in FIG. 13 is correctly arranged and disposed in accordance with the above-mentioned method. As can be seen from FIG. 14, each wireless tag 29-n is disposed at various positions different from each other.

In FIG. 14, the wireless tags 29-n are disposed in a way such that the wireless tag indicated with darkest color is positioned at a backmost position and the wireless tag indicated with lightest color is positioned at a front most position. For the first through tenth sheets, each corresponding wireless tag is mounted in a manner such that the position in which the corresponding wireless tag is mounted is alternately moved back and front. For the sheets after the eleventh sheet, the wireless tags are mounted on the sheets in a manner such that the wireless tag of an odd number order is positioned at a rightmost position, and the wireless tags of a greater odd number are positioned gradually to the front portion; and that the wireless tag of an even number order is positioned at a leftmost position, and the wireless tags of a greater even number are positioned gradually to the back portion of the sheet.

As shown in the lower right portion of FIG. 13, none of the wireless tags 29-n are consecutively positioned at the same position. Accordingly, when the eighteen sheets are actually stacked, each wireless tag 29-n is held between the sheets as shown in FIG. 15 by a flexibility and dead weight of each sheet. Thus, each sheet constituting the bundle of sheets is stacked in a substantially horizontal manner, and thus the thickness of the bundle of sheets is substantially uniformed, wholly and entirely. Therefore, letting t1 be the thickness of one sheet and t2 be the thickness of one wireless tag, the thickness of the stacked eighteen sheets is expressed by an equation $$t1\times 18+(t2-t1).$$

As explained above, in the case of the eighteen sheets, by alternately changing the mount position of the wireless tag sheet by sheet, the thickness of the sheet is smaller by an amount obtained by an equation $$(t2-t1)\times 18,$$

compared to the total thickness of the wireless tags (t2×18). Further, the thickness of the bundle of the sheet can be uniformed wholly and entirely.

FIGS. 16A through 16D respectively show a case where the wireless tags 29-n are disposed on the sheets 28-n in various kinds of methods for disposing the wireless tags.

FIG. 16A shows a case where the method for disposing the wireless tags 29-n as shown in FIG. 13 is initiated on the upper lefthand corner (from left to right) of the sheet and then the lower righthand corner of the sheet (from right to left). This arranging of the wireless tags is continued to be applied up to a center portion of the sheet. FIG. 16B shows a case where the method for disposing the wireless tags as shown in FIG. 13 is started at a middle of the upper portion of the sheet, and then next to the middle lower portion of the sheet. FIG. 16C shows a case where the wireless tags are disposed in a counterclockwise spiral manner. FIG. 16D shows a case where the wireless tags are disposed at four different corners of the sheet in an appropriate order. By using the method of disposing the wireless tags as shown in FIGS. 16A through 16D, or by using applicable various kinds of disposing the wireless tags other than the methods as shown in FIGS. 16A through 16D, the thickness of the bundle of sheets can be uniformed wholly and entirely, while the thickness of the bundle of sheets is decreased to be as small as possible.

In the aforementioned above, in the cases of the drawings as used in the explanation, the wireless tags are positioned at thirty different positions on one sheet. Accordingly, in the case of the thirty-first sheet, the wireless tag 29-n is mounted at the same position as the first sheet, and the disposition of the wireless tags is repeated in the same way as the disposition of the wireless tags for the first to the thirtieth sheet. Thus, the thickness of the bundle of the sheet in a case where an n number of sheets are stacked is substantially expressed by an equation $$t1\text{(sheet thickness)}\times n+(t2\text{(wireless tag thickness)}-t1\text{(sheet thickness)})\times(n/30).$$

Of course, a maximum number of the wireless tags 29-n that can be disposed is determined by the size of the sheet and the size of the wireless tag. In this regard, an explanation is made as to a case, for example, where the disposition of the wireless tags 29-n is repeated for m number of sheets as one unit, that is, the case where m number of wireless tags can be mounted on one sheet. In this case, if the wireless tags 29-n are arranged by alternately changing the mount position thereof, the thickness of the sheet bundle when n number of sheets are stacked can be substantially expressed by an equation $$t1\text{(sheet thickness)}\times n+(t2\text{(wireless tag thickness)}-t1\text{(sheet thickness)})\times(n/m).$$

Therefore, in the case where the wireless tag thickness t2 is greater than the sheet thickness t1, the thickness of the sheet bundle can be greatly reduced, compared to the thickness of the sheet bundle of n number of sheets in the case where the wireless tags are disposed at the same position. Further, each sheet constituting the sheet bundle is stacked in a substantially horizontal manner. Accordingly, the thickness of the sheet bundle can be uniformed wholly and entirely.

Fourth Exemplary Embodiment

In a fourth exemplary embodiment of the present invention, an example is explained as to a method of disposition of the wireless tags 29 with consideration on the size and an effective communication range of the wireless tag 29.

Figure 17:
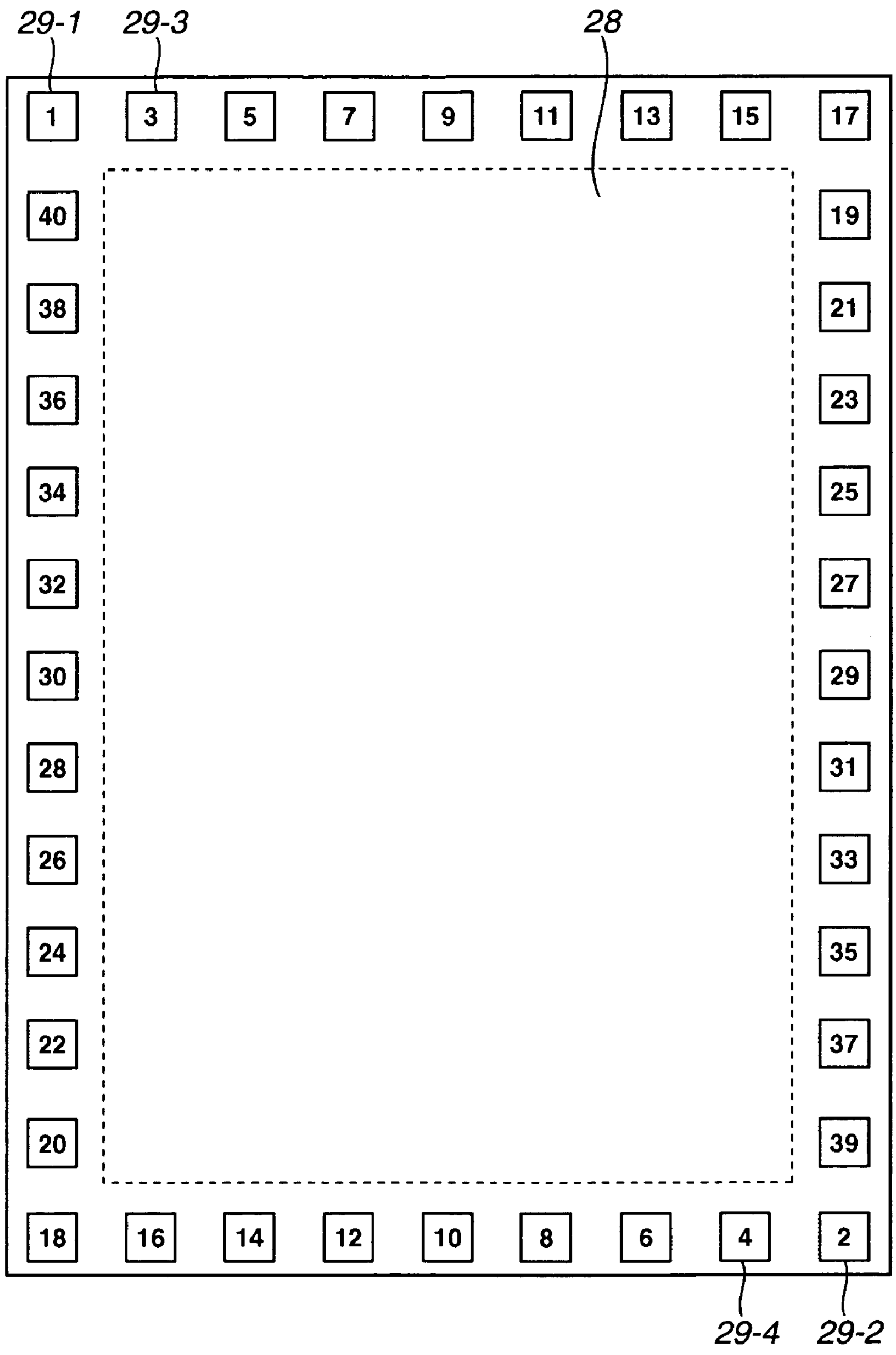
FIG. 17 is a schematic diagram illustrating a method for arranging wireless tags according to a fourth exemplary embodiment of the present invention.
Figure 18:
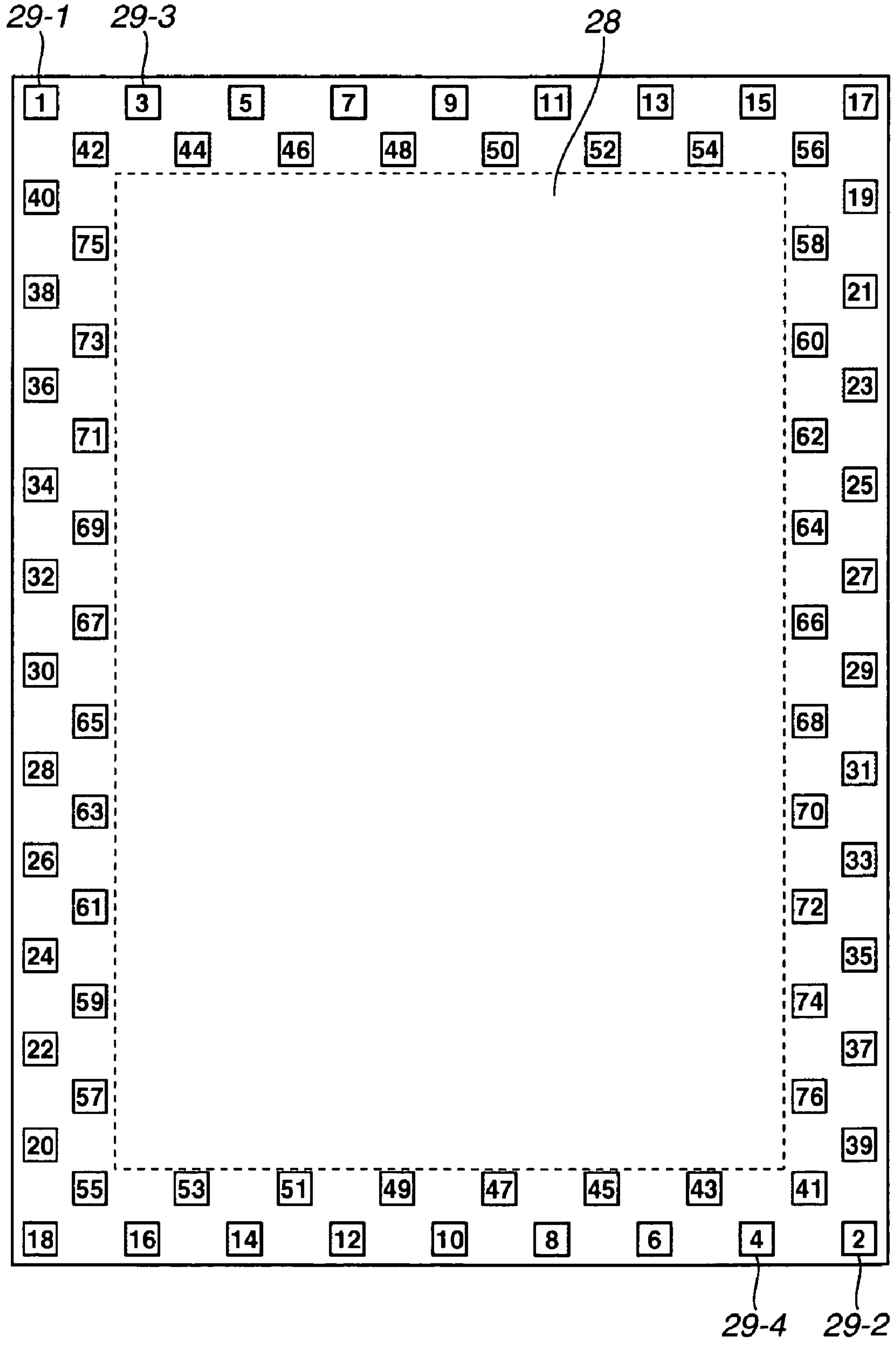
FIG. 18 is a schematic diagram illustrating another exemplary method for arranging wireless tags according to the fourth embodiment of the present invention.
Figure 19:
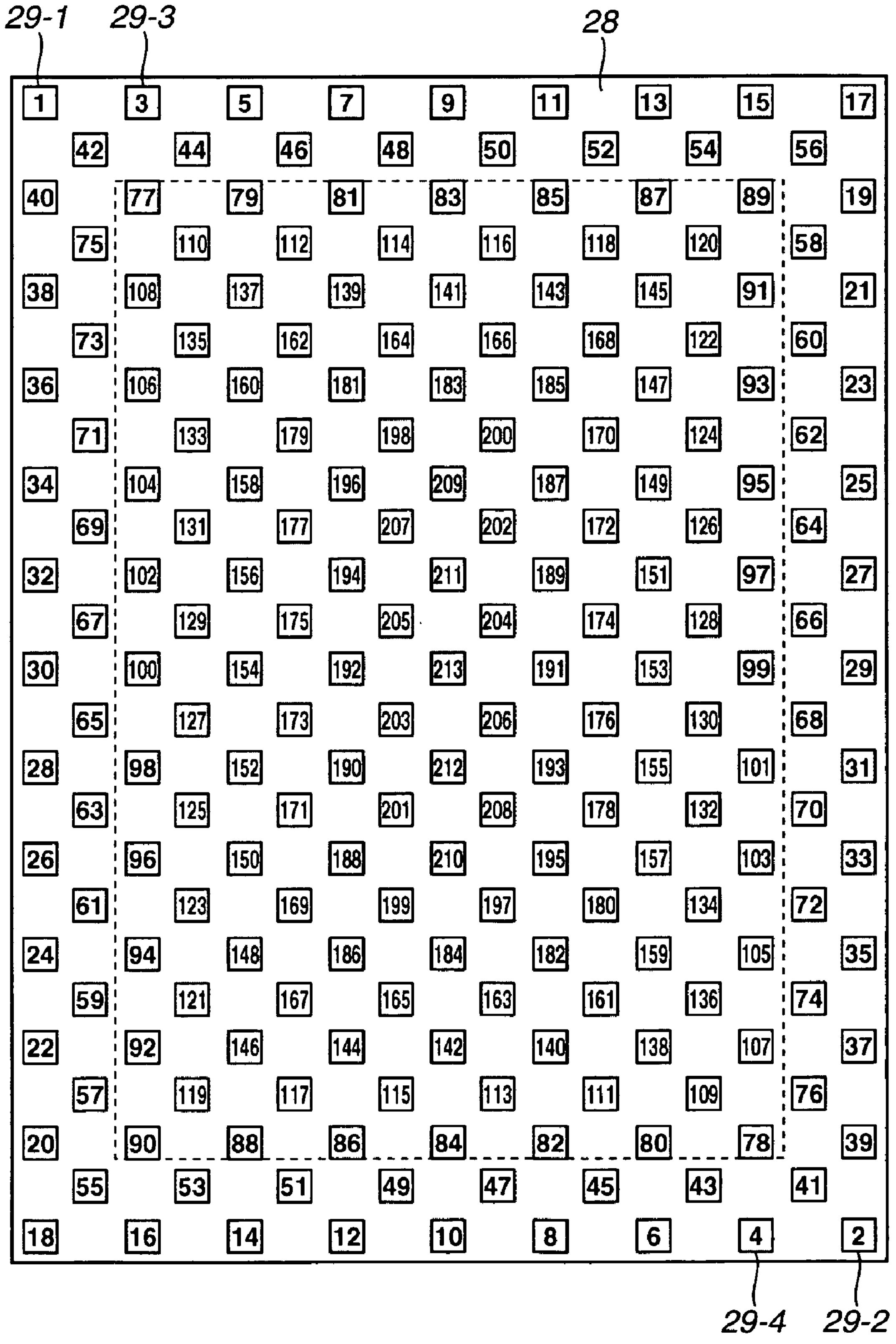
FIG. 19 is a schematic diagram illustrating another method for arranging wireless tags according to the fourth embodiment of the present invention.

FIGS. 17 through 19 respectively show various examples of the method for disposing the wireless tags 29. Each of FIGS. 17 through 19 shows a case where the wireless tags 29 are disposed on each sheet of the sheets 28 with alternately changing the mount position of the wireless tag and the mount positions of the wireless tags are overlapped on one sheet. In each of FIGS. 17 through 19, a portion surrounded with dotted lines drawn in the inside of the sheet 28 is an image area into which the image forming apparatus forms an image. The portion outside the area surrounded by the dotted lines is a margin into which no image is formed.

In FIG. 17, the wireless tag 29-1 represents the mount position of the wireless tag 29 mounted on the first sheet. The wireless tag 29-2 represents the mount position of the wireless tag 29 mounted on the second sheet. The same applies to the wireless tag 29-3 and the wireless tag 29-4 in a corresponding manner. As shown in FIG. 17, the mount positions of the wireless tags 29 are alternately changed to mutually different diagonal positions of the sheet.

In the case shown in FIG. 17, the size of the wireless tag 29 is large enough to be visible, and accordingly, only one row of wireless tags are arranged for each marginal portion, without disposing a wireless tag in the image area. In this case, forty wireless tags are mounted in the marginal area of one sheet. Of course, the maximum number of wireless tags that can be disposed on one sheet is determined by the relationship between the size of the sheet and the size of the wireless tag to be used.

Next, FIG. 18 shows a case where the size of each wireless tag is smaller than those in the case of FIG. 17 but the wireless tag is still visible. In FIG. 18, the wireless tag 29-1 represents the mount position of the wireless tag 29 mounted on the first sheet. The wireless tag 29-2 represents the mount position of the wireless tag 29 mounted on the second sheet. The same applies to the wireless tag 29-3 and the wireless tag 29-4 in a corresponding manner. As shown in FIG. 18, the mount positions of the wireless tags 29 are alternately changed to mutually different diagonal positions of the sheet.

In the case shown in FIG. 18, the size of the wireless tag is small but the wireless tags are still visible, and accordingly, the wireless tags are not disposed in the image area and the wireless tags 29 are disposed only in the marginal area. In the case shown in FIG. 18, the wireless tags 29 are disposed in two rows in each marginal area. In this case, seventy six wireless tags 29 are mounted in the applicable area for one sheet. Of course, the number of rows by which the wireless tags can be disposed and the number of wireless tags that can be disposed on one sheet are determined by the relationship between the size of the sheet and the size of the wireless tag to be used.

In the case shown in FIG. 19, the size of each wireless tag is even smaller than that in the case shown in FIG. 18 and the wireless tag is not visible. In FIG. 19, the wireless tag 29-1 represents the mount position of the wireless tag 29 mounted on the first sheet. The wireless tag 29-2 represents the mount position of the wireless tag 29 mounted on the second sheet.

The same applies to the wireless tag 29-3 and the wireless tag 29-4 in a corresponding manner. As shown in FIG. 19, the mount positions of the wireless tags 29 are alternately changed to mutually different diagonal positions of the sheet.

In the case shown in FIG. 19, as described above, the size of the wireless tag 29 is too small to be visible, and accordingly, the wireless tags 29 are disposed in the image area also. In this case, the wireless tags 29 are disposed all over the sheet 28. In this case, two hundred and thirteen wireless tags 29 are disposed in the applicable area of one sheet. Of course, the number of wireless tags that can be disposed on one sheet is determined by the relationship between the size of the sheet and the size of the wireless tag to be used.

In the embodiments as described above, an explanation is made assuming that an effective communication range of the wireless tag is large enough. On the contrary, FIG. 20 shows an embodiment of a case where the effective communication range of the communication between the wireless tag 29 and the receiving device 27 is small.

In this case, if the wireless tag is mounted on the sheet 28 at only one position, and if the sheet 28 is reversed in the horizontal direction by 180 degrees to stack into the sheet cassette 23, the wireless communication between the wireless tag 29 and the receiving device 27 is liable to fail. Therefore, two wireless tags 29 are disposed for every sheet of the sheets 28 by changing the mount position of the wireless tags. Here, the two wireless tags are provided with the same information. FIG. 20 shows a case where the mount position of each wireless tag is overlapped on one sheet.

Figure 20:
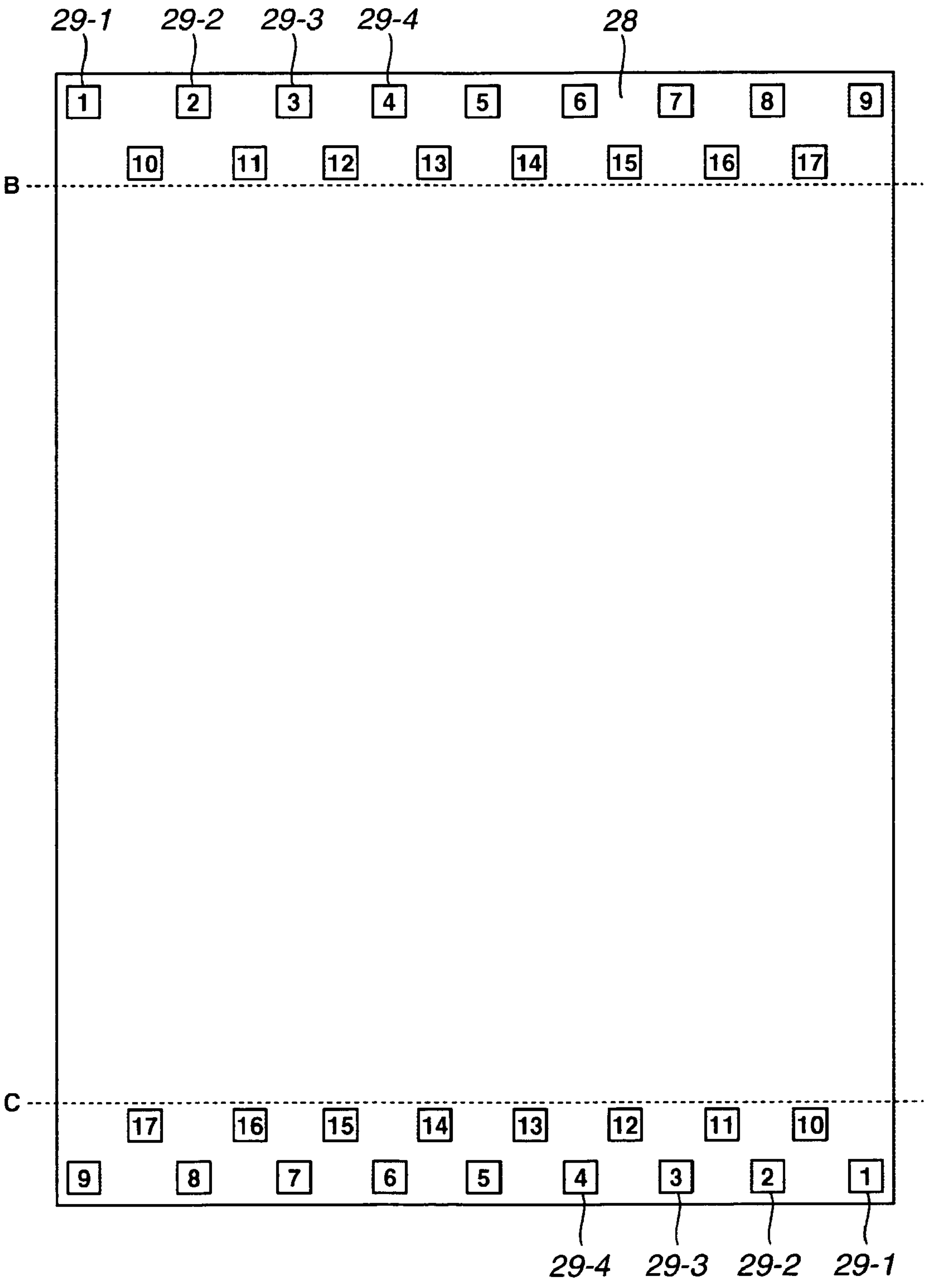
FIG. 20 is a schematic diagram illustrating still yet another exemplary method for arranging wireless tags according to the fourth embodiment of the present invention.

In FIG. 20, in a case where the sheets 28 are stacked into the sheet cassette 23 in the direction shown in FIG. 20, the effective communication range of the communication between the wireless tag 29 and the receiving device 27 is equivalent to the portion outside the area determined by a dotted line B. In addition, if the sheets 28 are stacked into the sheet cassette 23 by reversing the sheets 28 from the direction of the stacked sheets as shown in FIG. 20 by 180 degrees in the horizontal direction, the portion outside the area determined by a dotted line C is the effective communication range of the communication between the wireless tag 29 and the receiving device 27.

In FIG. 20, two wireless tags 29-1 are provided, and each of the two wireless tags 29-1 represents the mount position of the wireless tag 29 mounted on the first sheet. Likewise, two wireless tags 29-2 are provided, and each of the two wireless tags 29-2 represents the mount position of the wireless tag 29 mounted on the second sheet. The same applies to the wireless tags 29-3 and the wireless tags 29-4. As shown in FIG. 20, the wireless tags are disposed at mutually different positions at diagonal positions of the sheet, with two wireless tags as one set. Thus, if the sheets 28 are stacked into the sheet cassette 23 by reversing the sheets 28 by 180 degrees in the horizontal direction, the communication between the wireless tag 29 and the receiving device 27 does not fail.

In the case shown in FIG. 20, the size of the wireless tag 29 is very small and, therefore, the effective communication range of the communication between the wireless tag 29 and the receiving device 27 is small. In order to overcome this, two wireless tags 29 are diagonally mounted on the sheet 28 as one set and two rows of the wireless tags 29 are disposed within the effective communication range of the communication between the wireless tag 29 and the receiving device 27. In this case, seventeen wireless tags 29 are mounted in the applicable area of one sheet. Of course, the number of wireless tags that can be disposed on one sheet is determined by the relationship between the size of the sheet and the size of the wireless tag to be used.

Note that in FIG. 20, a case where the wireless tags 29 are disposed on the sheet at two positions is shown as an example. However, the wireless tags 29 may be disposed at three positions or more. In this case also, the effect of enabling and implementing a stable sheet feeding and a stable wireless communication can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-073116 filed Mar. 15, 2005 and No. 2005-075164 filed Mar. 16, 2005, which are hereby incorporated by reference herein in their entirety.

What is claimed is:

1. An image forming apparatus configured to communicate with a server that manages control information of the image forming apparatus corresponding to each type of sheet via a network, the image forming apparatus comprising:

a sheet storing device adapted to store a plurality of sheets, wherein at least one of the plurality of sheets includes a wireless tag;

a receiving device configured to receive an IP address sent from the wireless tag, wherein the IP address indicates a location of the server that stores the control information of the image forming apparatus corresponding to the type of sheet stored in the sheet storing device;

a communication device configured to obtain the control information from the server via the network based on the IP address received by the receiving device;

a controller configured to control an image forming condition based on the control information obtained by the communication device;

and a memory configured to store information, wherein the memory is configured to store both the IP address obtained from the wireless tag and the control information obtained from the server while relating the IP address obtained from the wireless tag with the control information obtained from the server, and wherein the controller is configured to compare the IP address obtained from the wireless tag with an IP address previously stored in the memory, and, when it is determined that the IP address previously stored in the memory is equivalent to the IP address obtained from the wireless tag, the controller does not obtain the control information from the server and the controller controls an image forming condition in accordance with the control information that is stored in the server having a location indicated by the IP address previously stored in the memory.

2. The image forming apparatus according to claim 1, wherein the wireless tag is one of an IC tip, an IC tag, an RFID tag, and an RF-tag.

3. The image forming apparatus according to claim 1, wherein the control information includes at least one of fixing temperature control information, process speed information, and transfer high voltage output information.

4. The image forming apparatus according to claim 1, wherein the memory is configured to store the IP address obtained from the wireless tag.

5. The image forming apparatus according to claim 1, wherein the memory is configured to store the control information obtained from the server.

6. The image forming apparatus according to claim 1, further comprising: a plurality of sheet storing devices.

7. The image forming apparatus according to claim 6, further comprising: a plurality of receiving devices each of which corresponds to each of the plurality of sheet storing devices.

8. The image forming apparatus according to claim 6, wherein the receiving device is positioned at a downstream side of a confluence of sheet conveyance paths from the plurality of sheet storing devices in a direction of sheet conveyance.

9. The image forming apparatus according to claim 1, wherein the receiving device receives the IP address sent from the wireless tag when the image forming apparatus is turned on, wherein the communication device obtains the control information from the server via the network based on the IP address received by the receiving device, and wherein the controller controls an image forming condition in accordance with the control information obtained by the communication device.

10. The image forming apparatus according to claim 1, wherein the receiving device receives the IP address sent from the wireless tag in response to closure of the sheet storing device, wherein the communication device obtains the control information from the server via the network based on the IP address received by the receiving device, and wherein the controller controls an image forming condition in accordance with the control information obtained by the communication device.

11. The image forming apparatus according to claim 1, wherein the receiving device receives the IP address sent from the wireless tag mounted on a sheet fed from the sheet storing device during image formation.

12. The image forming apparatus according to claim 11, wherein the communication device obtains the control information from the server via the network if the IP address sent from the wireless tag that is received by the receiving device is different from an IP address sent from a wireless tag and is received by the receiving device in relation to a last sheet.

13. The image forming apparatus according to claim 1, wherein each sheet of the plurality of sheets includes a wireless tag, and a mount position of each wireless tag is different with respect to the plurality of sheets.

14. The image forming apparatus according to claim 13, wherein with respect to the plurality of sheets each having a wireless tag, a mount position of each wireless tag is different within each unit of a prescribed number of sheets.

15. The image forming apparatus according to claim 13, wherein with respect to the plurality of sheets each having a wireless tag, the wireless tags are alternately disposed at positions located at mutually diagonal positions.

16. The image forming apparatus according to claim 13, wherein a thickness of a portion of a first sheet in which a wireless tag is mounted is greater than a thickness of a portion of the first sheet in which the wireless tag is not mounted.

17. The image forming apparatus according to claim 13, wherein with respect to the plurality of sheets each having a wireless tag, each wireless tag is mounted only in a marginal area of the sheet having that wireless tag.

18. The image forming apparatus according to claim 13, wherein with respect to the plurality of sheets each having a wireless tag, a plurality of wireless tags are disposed in at least two positions of one sheet, and wherein a mount position of each wireless tag is different with respect to each of the sheets.

19. The image forming apparatus according to claim 18, wherein the plurality wireless tags that are disposed in at least two positions of one sheet stores the same information.

20. An image forming system including an image forming apparatus adapted to be connected to a network and a server that manages control information of the image forming apparatus corresponding to each type of sheet, the image forming system comprising:

a sheet storing device provided in the image forming apparatus, wherein the sheet storing device is configured to store a plurality of sheets, wherein at least one of the plurality of sheets includes a wireless tag;

a receiving device provided in the image forming apparatus, wherein the receiving device is configured to receive an IP address sent from the wireless tag, wherein the IP address indicates a location of the server that stores the control information of the image forming apparatus corresponding to the type of sheet stored in the sheet storing device;

a device type information sending device provided in the image forming apparatus, wherein the device type information sending device is configured to transmit device type information of the image forming apparatus to the server via the network based on the IP address received by the receiving device;

a control information sending device provided in the server, wherein the control information sending device is configured to transmit control information to the image forming apparatus in accordance with the device type information sent from the device type information sending device;

a controller provided in the image forming apparatus, wherein the controller is configured to control an image forming condition based on the control information transmitted from the control information sending device;

and a memory provided in the image forming apparatus and configured to store information, wherein the memory is configured to store both the IP address obtained from the wireless tag and the control information obtained from the server while relating the IP address obtained from the wireless tag with the control information obtained from the server, and wherein the controller is configured to compare the IP address obtained from the wireless tag with an IP address previously stored in the memory, and, when it is determined that the IP address previously stored in the memory is equivalent to the IP address obtained from the wireless tag, the controller does not obtain the control information from the server and the controller controls an image forming condition in accordance with the control information that is stored in the server having a location indicated by the IP address previously stored in the memory.

21. A method performed by an image forming apparatus adapted to be connected to a server that manages control information of the image forming apparatus corresponding to each type of sheet via a network, the method comprising:

a receiving step of receiving an IP address sent from a wireless tag contained in a sheet stored in a sheet storing device of the image forming apparatus, wherein the IP address indicates a location of the server that stores the control information of the image forming apparatus corresponding to the type of sheet stored in the sheet storing device;

a communication step of obtaining the control information from the server via the network based on the IP address received in the receiving step; and a control step of controlling an image forming condition based on the control information obtained in the communication step; and a memory step of storing information, wherein storing includes storing both the IP address obtained from the wireless tag and the control information obtained from the server while relating the IP address obtained from the wireless tag with the control information obtained from the server, and wherein controlling in the control step includes comparing the IP address obtained from the wireless tag with an IP address previously stored, and, when it is determined that the IP address previously stored is equivalent to the IP address obtained from the wireless tag, the control step does not obtain the control information from the server and the control step controls an image forming condition in accordance with the control information that is stored in the server having a location indicated by the IP address previously stored in the memory step.

22. A non-transitory computer-readable medium having stored thereon, a program that causes an image forming apparatus to perform a method according to claim 21.

23. An image forming apparatus configured to communicate with a server that manages control information of the image forming apparatus corresponding to each type of sheet via a network, the image forming apparatus comprising:

a sheet storing device adapted to store a plurality of sheets, wherein at least one of the plurality of sheets includes a wireless tag;

a receiving device configured to receive an IP address sent from the wireless tag, wherein the IP address indicates a location of the server that stores the control information of the image forming apparatus corresponding to the type of sheet stored in the sheet storing device;

a communication device configured to obtain the control information from the server via the network based on the IP address received by the receiving device; and a controller configured to control an image forming condition based on the control information obtained by the communication device, wherein the receiving device receives the IP address sent from the wireless tag mounted on a sheet fed from the sheet storing device during image formation, and wherein the communication device obtains the control information from the server via the network if the IP address sent from the wireless tag that is received by the receiving device is different from an IP address sent from a wireless tag and is received by the receiving device in relation to a last sheet.

24. An image forming system including an image forming apparatus adapted to be connected to a network and a server that manages control information of the image forming apparatus corresponding to each type of sheet, the image forming system comprising:

a sheet storing device provided in the image forming apparatus, wherein the sheet storing device is configured to store a plurality of sheets, wherein at least one of the plurality of sheets includes a wireless tag;

a receiving device provided in the image forming apparatus, wherein the receiving device is configured to receive an IP address sent from the wireless tag, wherein the IP address indicates a location of the server that stores the control information of the image forming apparatus corresponding to the type of sheet stored in the sheet storing device;

a device type information sending device provided in the image forming apparatus, wherein the device type information sending device is configured to transmit device type information of the image forming apparatus to the server via the network based on the IP address received by the receiving device;

a control information sending device provided in the server, wherein the control information sending device is configured to transmit control information to the image forming apparatus in accordance with the device type information sent from the device type information sending device; and a controller provided in the image forming apparatus, wherein the controller is configured to control an image forming condition based on the control information transmitted from the control information sending device, wherein the receiving device receives the IP address sent from the wireless tag mounted on a sheet fed from the sheet storing device during image formation, and wherein the device type information sending device obtains the control information from the server via the network if the IP address sent from the wireless tag that is received by the receiving device is different from an IP address sent from a wireless tag and is received by the receiving device in relation to a last sheet.

25. A method performed by an image forming apparatus adapted to be connected to a server that manages control information of the image forming apparatus corresponding to each type of sheet via a network, the method comprising:

a receiving step of receiving an IP address sent from a wireless tag contained in a sheet stored in a sheet storing device of the image forming apparatus, wherein the IP address indicates a location of the server that stores the control information of the image forming apparatus corresponding to the type of sheet stored in the sheet storing device;

a communication step of obtaining the control information from the server via the network based on the IP address received in the receiving step; and a control step of controlling an image forming condition based on the control information obtained in the communication step, wherein the receiving step receives the IP address sent from the wireless tag mounted on a sheet fed from the sheet storing step during image formation, and wherein the communication step obtains the control information from the server via the network if the IP address sent from the wireless tag that is received by the receiving step is different from an IP address sent from a wireless tag and is received by the receiving step in relation to a last sheet.

* * * * *